United States Patent
Bragagnini et al.

(10) Patent No.: US 8,274,979 B2
(45) Date of Patent: Sep. 25, 2012

(54) METHOD AND SYSTEM FOR SECURE COMMUNICATION BETWEEN A PUBLIC NETWORK AND A LOCAL NETWORK

(75) Inventors: Andrea Bragagnini, Turin (IT); Diego Buffa, Turin (IT); Paolo Pellegrino, Turin (IT); Luca Scevola, Turin (IT); Drory Shohat, Ramat-Gan (IL); Zac Sadan, Givat-Shmuel (IL); Niv Gilboa, Tel Aviv (IL)

(73) Assignee: Telecom Italia S.p.A., Milan (IT)

( * ) Notice: Subject to any disclaimer, the term of this patent is extended or adjusted under 35 U.S.C. 154(b) by 470 days.

(21) Appl. No.: 12/087,171

(22) PCT Filed: Dec. 30, 2005

(86) PCT No.: PCT/EP2005/014141
§ 371 (c)(1),
(2), (4) Date: Nov. 24, 2008

(87) PCT Pub. No.: WO2007/076883
PCT Pub. Date: Jul. 12, 2007

(65) Prior Publication Data
US 2009/0323703 A1    Dec. 31, 2009

(51) Int. Cl.
*H04L 12/56* (2006.01)
*G06F 15/16* (2006.01)
(52) U.S. Cl. .................. 370/392; 370/401; 709/228
(58) Field of Classification Search .................. 370/392, 370/401; 709/227, 228
See application file for complete search history.

(56) References Cited

U.S. PATENT DOCUMENTS

| | | | |
|---|---|---|---|
| 6,385,193 B1 * | 5/2002 | Civanlar et al. | 370/352 |
| 6,738,779 B1 | 5/2004 | Shapira | |
| 6,816,455 B2 | 11/2004 | Goldberg et al. | |
| 7,120,930 B2 * | 10/2006 | Maufer et al. | 726/11 |
| 2002/0075844 A1 * | 6/2002 | Hagen | 370/351 |
| 2002/0097724 A1 * | 7/2002 | Halme et al. | 370/392 |
| 2002/0112076 A1 * | 8/2002 | Rueda et al. | 709/245 |
| 2002/0116616 A1 * | 8/2002 | Mi et al. | 713/168 |
| 2003/0154306 A1 * | 8/2003 | Perry | 709/245 |
| 2004/0013112 A1 | 1/2004 | Goldberg et al. | |
| 2005/0038906 A1 * | 2/2005 | Banes et al. | 709/238 |
| 2006/0078096 A1 * | 4/2006 | Poyhonen et al. | 379/88.12 |

FOREIGN PATENT DOCUMENTS

WO    WO 2005/062233 A3    7/2005

* cited by examiner

*Primary Examiner* — Dang Ton
*Assistant Examiner* — Ryan Kavleski
(74) *Attorney, Agent, or Firm* — Finnegan, Henderson, Farabow, Garrett & Dunner, L.L.P.

(57) ABSTRACT

A method for secure communication between a local area network and a wide area network includes integrating a NAT functionality in a firewall associated with the local area network, wherein the NAT functionality is suitable to translate the source port of outgoing data packets with a NAT port value obtained by adding to a NAT offset value the value of the session ED used in a session database. When reply data packets coming from the wide area network are received by the firewall, the session ID is extracted from the NAT port value and is used for directly pointing to the session database, thus reducing the time required to recognize the session.

13 Claims, 17 Drawing Sheets

METHOD AND SYSTEM FOR SECURE COMMUNICATION BETWEEN A PUBLIC NETWORK AND A LOCAL NETWORK

CROSS REFERENCE TO RELATED APPLICATION

This application is a national phase application based on PCT/EP2005/014141, filed Dec. 30, 2005.

FIELD OF THE INVENTION

The present invention generally relates to the field of telecommunications, particularly to communications between a public network WAN (Wide Area Network) such as the global Internet and a local network LAN (Local Area Network). More specifically, the invention relates to secure communications between a LAN and a WAN.

BACKGROUND OF THE INVENTION

In recent years, the world has witnessed the explosive growth of the Internet. Each year many more hosts are added while the number of users seems to be growing without limit. The Internet enables communications using different techniques including remote computer login, file transfer, world wide web (WWW) browsing, email, etc. Various protocols have been designed and are in use on the Internet to handle various types of communications. For example, file transfer protocol (FTP) for file transfer, hypertext markup language (HTML) for web traffic, etc. . . . Generally, the protocols related to Internet communications are grouped under the umbrella of the transmission control protocol/internet protocol (TCP/IP) suite of protocols that includes protocols at various layers of the OSI communications stack.

A key feature of the Internet is that it is a public network that is accessible by nearly anyone with a computer, telephone line and Internet service provider (ISP) account. A downside to this wide scale public accessibility is that it permits easy access for hackers and others intent on carrying out malicious activities against one or more hosts on the Internet. Illegal conduct such as stealing of secret information or the deletion of important files by a malicious user is possible by a hacker that manages to break into a computer on a remote network and succeed to tap communication data. The need for security was addressed by the Internet Architecture Board (IAB) by including security features in IPv6 such as encryption and authentication in that permit secure transactions over the Internet.

To combat the threat of hackers and to secure private networks, it is common today to place a firewall at the entrance of the private network in a company or organization. The firewall is a system that sits at the boundary between the local network of the organization and the global Internet, and employs some form of packet filter that functions to enforce a user defined security policy. It implements the filtering of all data communications in order to prevent leakage of information out to the external network and to prevent unauthorized access of the internal network from the outside. A deny/allow decision is made for each packet that is received by the firewall.

At the same time, the world is witnessing increasing demand for wireless services (i.e. cellular phones, two way pagers, cordless devices, etc.) and personal computing devices such as laptops, PDAs, etc. Many of these personal computing devices incorporate wireless communications circuitry to enable them to communicate via wireless networks (e.g., cellular or other broadband schemes) to WAN networks such as the Internet. Thus, more and more PDAs and cellular telephones are being connecting to the Internet thus exposing these devices to security risks. Preferably, these devices employ some type of firewall to protect against unauthorized access to the device. Most firewalls today, however, are implemented in software and require the computing resources of an entire desktop computer, making their use in a portable computing device such as cellular telephone or PDA impractical.

Thus, there is a need for a firewall or packet filter that can be easily implemented in small size suitable for incorporated in small portable computing devices such as cellular telephones and wireless connected PDAs.

U.S. Pat. No. 6,816,455 B2 provides a dynamic packet filter that can be implemented in hardware, software or a combination of both inside a LAN access device. The dynamic packet filter is operative to filter both inbound packets from WAN to LAN and outbound packets from LAN to WAN. Dynamic filtering is effective to check dynamic protocol behavior rather than the static rules of a protocol. This is achieved by creating sessions to track the state of communications between the source and destination. New sessions are detected and created, and data related thereto is stored in a session database. An attempt is made to recognize each received packet and associate it with a previously opened session; if this association is not possible a new session is created. The same session is used to validate similar packets (for example packets belonging to the same TCP connection or reply packets). Packets not matching an existing session and not expressly recognized as valid (i.e. session-opener) are dropped by the firewall.

The process of finding a session matching to a packet is performed using hash tables: when the packet is received by the system a hash value is computed according to its "socket fields", containing source and destination IP addresses, protocol, source and destination TCP/UDP ports, if any. This hash value is then used to address a hash table whose elements point to active sessions. In case more than one session has the same hash value, these sessions are organized in a double linked list with the head pointed by the hash table elements. So the hash value is used to indirectly point to the first session in this list. If, by checking all socket fields, it is verified that this first session doesn't match the packet, the system proceeds to the next one and so on until a matching session is found or end of hash list is reached. If an existing session is found, the session related data is read from the session database and the received packet is checked against a set of rules. The rules are described as state transition diagrams that specify the states and transitions permitted by the particular protocol. If a packet conforms to the legal behavior for the protocol, it is allowed, otherwise, it is denied. The session data is then updated with new state information and related parameters and then it is written back into the session database.

SUMMARY OF THE INVENTION

The Applicant has tackled the problem of providing a firewall including dynamic filter functionality, such as the one described in U.S. Pat. No. 6,816,455 B2, with a particularly efficient Network Address Translation (NAT) functionality.

As is known in the art, a NAT is a protection function that, by masquerading private addresses of a local area network (LAN) with the public address of the access device, allows the users within the LAN to connect to a wide area network (WAN). In particular, the NAT function masks a set of private IP addresses with its own public address (that normally is the address of the access network device) using a different transport port (TCP or UDP) for each different connection. This means that for an outgoing (from LAN to WAN) packet its source IP address is replaced by the NAT IP address and its source port is replaced by a specific NAT port. This port is used also to distinguish incoming replies for inverse translation.

The Applicant has observed that the integration of a typical NAT functionality within the firewall described in U.S. Pat. No. 6,816,455 B2 or in another similar firewall would require either the modification of the session database managed by the firewall or the introduction of a further database to be used for the NAT operations. Moreover, the Applicant has observed that a firewall like the one described in U.S. Pat. No. 6,816,455 B2 must perform time-consuming session recognition operations each time a packet arrives, and the integration of a typical NAT would provide no benefits in this sense.

The Applicant has found that a NAT function can be integrated in a firewall such as the one described in U.S. Pat. No. 6,816,455 B2 by means of a mechanism that avoids any change in the firewall's session database or the introduction of a further database for the NAT functionality, and that can assure very fast processing of incoming packets. This mechanism translates the source port of outgoing packets into a NAT port value that is univocally related to the session index in the session database, in particular it contains this session index value superimposed to an offset value. The reply packets arriving from the WAN will thus contain the same port value as destination port, and the session index can be extracted therefrom by the firewall and used to directly point the session database. As a result, the time required for the operation of session recognition can be sensibly reduced. According to the present invention, therefore, the NAT is not choosing the values of the ports but uses the values that the packet filter makes available to it. The NAT function of the present invention is advantageously applied to communication sessions initiated by the LAN.

In order to work correctly with a firewall/NAT system, some applications require the presence of particular modules called Application Layer Gateways (ALGs). An ALG is typically used to allow a determined application to work in the presence of firewall functionalities, NAT functionalities or integrated firewall/NAT functionalities. ALGs are typically designed to monitor peer-to-peer traffic, recognize the used protocol, read and modify, if necessary, the payload of the exchanged packets (differently from the NAT, which is able only to intervene on the header portion), check coherence with protocol rules and authorize particular operations, such as opening of new sessions (of different types) between the two peers.

In the presence of a firewall/NAT, the ALG must change, when necessary, the payload of packets in order to reflect the translations, performed by the NAT, of IP addresses and ports in the header. For example in the FTP application it must replace in the payload of the PORT commands packets the private IP with the NAT IP and the TCP port with the dynamic NAT port (the index of the session of data connection). The ALG must also deeply analyse the traffic flow in order to recognize the protocol and open the firewall for new sessions opened by the application or close it for sessions expired or closed. For example, in a FTP application it must recognize in the payload of the packets belonging to the control connection the characteristics of the agreed new data connections and instruct the firewall accordingly.

However there are more complex protocols that have also other requirements. The Session Initiation Protocol (SIP) used in VoIP applications is one important example. When a SIP session is initiated with an INVITE message, that message contains information about where the sender of the message will listen for RTP and RTCP multimedia connections; but together with the IP address, there is only one field indicating the RTP port. The RTCP port must be derived from the RTP port and must be exactly the next value, i.e., the two values must be contiguous. Another constraint is that the RTP port must be even (and obviously the RTCP one must be odd). Considering the firewall described in U.S. Pat. No. 6,816,455 B2, the dynamic packet filter should therefore be able to open two sessions with consecutive ports, of which the first must be even. This is not a problem in "firewall-only" mode, because the information on the port is stored in the session and there is no relation between the port values and the session indexes. But in the "NAT-mode" according to the present invention only the private port values are stored in sessions; the public ones are bound to the index in the array of the two sessions (RTP and RTCP). It is thus not guaranteed that two sessions have consecutive index values because the LRU list is dynamic by its nature.

The Applicant has therefore observed that, in view of the particular NAT functionality used in the present invention, the integration of the ALG in the firewall requires an optimized session management solution, suitable to match the needs of the different applications protocols in terms of sessions availability. In particular, this session management solution must be able to make available groups of sessions formed by a predetermined number of consecutive sessions (i.e. of sessions having consecutive NATted ports).

Therefore, according to another aspect of the present invention, it is described a method for integrating an ALG in a NAT/Firewall device realized with the NAT solution proposed above. The method applies to the session pool used to organize the sessions in the database according to the temporal order of their utilization. More precisely it consists in creating, during an initialization step, a "special session pool" separated from the normal session pool and containing a number of available sessions that is a multiple of a minimum number of sessions required by a specific transmission protocol, so as to allow the pick-up of a predetermined number of consecutive sessions. Accordingly, each time an ALG needs a session or a group of sessions with defined characteristics, it can get them from the special pool and insert them in the list of active sessions (to let the packet filter treat them as normal sessions). Finally, when sessions become unused, they are inserted again in the pool.

Therefore, according to a first aspect thereof, the present invention relates to a method for exchanging digital data between a local area network and a wide area network, comprising:
  opening a communication session between the local area network and the wide area network;
  keeping trace of said session in a session database where said session is associated with a respective session identifier;
  communicating to the wide area network said session identifier;
  sending from the wide area network to the local area network at least a data packet having a destination port value indicative of the session identifier; and
  using the session identifier indicated in the data packet for directly accessing said session in the session database.

Preferably, the step of sending at least a data packet from the wide area network to the local area network is preceded by the step of sending from the local area network to the wide area network at least a data packet containing said session identifier.

More preferably, sending from the local area network to the wide area network at least a data packet containing the session identifier comprises sending from the local area network to the wide area network at least a data packet having a source port value related to the session identifier.

The method may further comprise, before using said session identifier, the step of extracting the session identifier from the destination port value.

Preferably, accessing said session in the session database comprises pointing to said session in the session database.

The method may further include the step of checking the at least a data packet sent from the wide area network against a set of rules corresponding to at least a protocol and, if the rules are not fulfilled, stopping the data packets.

The destination port value is preferably the sum of a fixed value and said session identifier. Analogously, the source port value is preferably the combination of a fixed value and said session identifier.

The method may further comprise managing the sessions in a session list where the sessions are arranged according to a least-recently-used order and are linked to each other.

Preferably, the sessions are double-linked to each other.

Preferably, the list is a first list and the session database comprises a second list of sessions including empty sessions extracted from the first list.

The second list may include a number of sessions that is a multiple of a minimum number of sessions required by an application protocol.

Preferably, opening a communication session comprises extracting a predetermined number of sessions from the second list and inserting the predetermined number of sessions into the first list.

The step of sending from the local area network to the wide area network at least a data packet having a source port value related to the session identifier may be preceded by the step of changing an original source port value into the source port value.

The step of changing an original source port value into said source port value is preferably performed by a Network Address Translator.

The step of using the session identifier for accessing said session in the session database is preferably performed in a processing apparatus associated with the local area network.

The session database may be associated with an access gateway associated with the local area network.

According to a second aspect thereof, the present invention relates to telecommunication system comprising:
- a local area network and a wide area network suitable to exchange with each other data packets within respective communication sessions;
- a processing apparatus interposed between the local area network and the wide area network and configured to read the destination port value of packets directed from the wide area network to the local area network;
- a session database associated with the processing apparatus for keeping trace of said sessions, said sessions being identified in the session database by means of a session identifier;
- wherein the processing apparatus is configured to receive at least a packet having a destination port value indicative of a session identifier, to extract the session identifier and to use the session identifier to directly accesses the respective session in the session database.

The processing apparatus is preferably also configured to provide data packets sent from the local area network to the wide area network with a source port value indicative of said session identifier.

Moreover, the processing apparatus is preferably configured to use said session identifier to directly point the respective session in the session database.

The present invention also relates to a network address translator configured to change the source port of data packet transmitted within a communication session from a first value to a second value indicative of an identifier of said session.

In the context of the present inventions, while an IP address identifies a computer in the Internet, a port (such as the source and destination ports here discussed) identifies an application running on the computer. Typically, ports 1-1023 are reserved for standard services and the operating system, whereas ports 1024-65535 can be used by any application.

BRIEF DESCRIPTION OF THE DRAWINGS

The features and advantages of the present invention will be made apparent by the following detailed description of an embodiment thereof, provided merely by way of non-limitative example, description that will be conducted making reference to the annexed drawings, wherein.

DETAILED DESCRIPTION OF THE PREFERRED EMBODIMENT(S) OF THE INVENTION

The following notation is used throughout this document.

| Term Definitions | |
|---|---|
| ADSL | Asymmetric Digital Subscriber Line |
| ALG | Application Layer Gateway |
| ARP | Address Resolution Protocol |
| ASIC | Application Specific Integrated Circuit |
| CPU | Central Processing Unit |
| DAT | Digital Audio Tape |
| DSL | Digital Subscriber Line |
| DSP | Digital Signal Processor |
| DVD | Digital Versatile Disk |
| EEPROM | Electrically Erasable Programmable Read Only Memory |
| EEROM | Electrically Erasable Read Only Memory |
| EPROM | Erasable Programmable Read Only Memory |
| FPGA | Field Programmable Gate Array |
| FTP | File Transfer Protocol |
| HDSL | High bit rate Digital Subscriber Line |
| HTML | Hyper Text Markup Language |
| IAB | Internet Architecture Board |
| ICMP | Internet Control Message Protocol |
| IP | Internet Protocol |
| ISP | Internet Service Provider |
| LAN | Local Area Network |
| LRU | Least Recently Used |
| NAT | Network Address Translation |
| NIC | Network Interface Card |
| OSI | Open Systems Interconnect |
| PC | Personal Computer |
| PDA | Personal Digital Assistant |
| PDU | Protocol Data Unit |
| RAM | Random Access Memory |
| ROM | Read Only Memory |
| TCP | Transmission Control Protocol |
| UDP | User Datagram Protocol |
| VDSL | Very high bit rate Digital Subscriber Line |
| WAN | Wide Area Network |
| WWW | World Wide Web |

Figure 1:
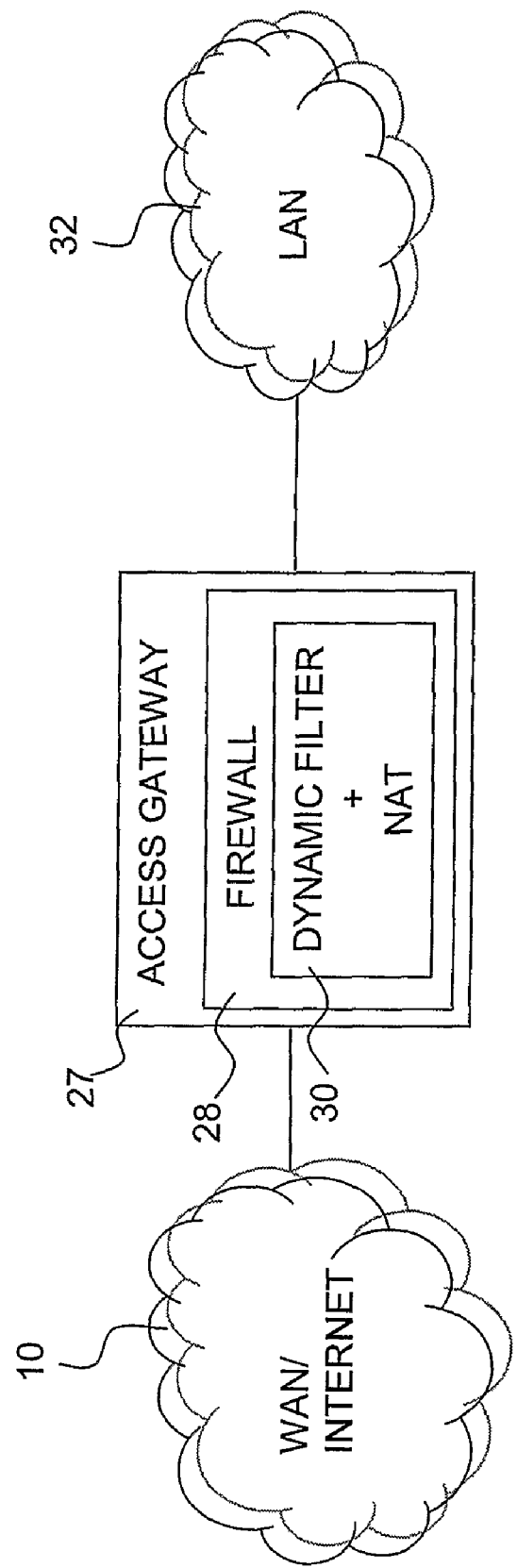
FIG. 1 is a block diagram illustrating a possible application of the dynamic packet filter of the present invention in the context of a WAN or Internet.

With reference to FIG. 1, a telecommunication system according to the present invention comprises a WAN 10, a LAN 32 suitable to communicate with the WAN 10 and a processing system 27 interposed between the WAN 10 and the LAN 32 and in wired or wireless communication with them. In the following it will be assumed that the processing system 27 is an access gateway.

The access gateway 27 includes a firewall 28 used to prevent unauthorized access to a protected network, and the firewall 28 in turn comprises a dynamic packet filter 40 having integrated therein a NAT. The dynamic filter in the firewall functions to filter packets sent from the Internet to the LAN and vice versa.

It has to be noted that the input stream may comprise any type of input data in accordance with the particular application, such as frames, packets, bytes, PDUs, etc. For illustration purposes only, the input data stream is considered as a sequence of packets.

The firewall 28 is also suitable for use in portable computing devices such as cellular telephones and wireless connected PDAs that are adapted to connect to the Internet.

The dynamic filter 40 can be implemented in hardware, software or, preferably, a combination of both (which assures the best balance between performance and flexibility). The dynamic filter 40 performs dynamic packet filtering on packets received over an input packet stream, for both inbound packets from WAN to LAN and outbound packets from LAN to WAN. The dynamic filter 40 is also effective to check dynamic protocol behavior (rather than the static rules of a protocol) by creating sessions to track the state of communications between the source and destination.

Moreover, the dynamic filter 40 is operative to maintain a connection table referred to as a session database for monitoring the state of a communications session. In particular, the dynamic filter 40 keeps trace of the different communication sessions by means of the session database, wherein each sessions is associated with a respective session identifier (session ID).

A new session is added to the session database if it passes a static security policy rule. Once a session is created, subsequent packets corresponding to this session are inspected in accordance with the session state for the particular protocol associated with the packet. The packet is allowed only if the packet conforms to the specifications of the particular protocol.

According to the present invention, the NAT functionality (translation of many private IP addresses with few or a single public IP address) is integrated in the firewall 28 by means of a mechanism that can assure fast processing of incoming signals. The access gateway 27 can decide, based on predetermined rules, if using or not the NAT functionality to change the source port of outgoing packets. This change, as will be described in the following, allows a simple and fast processing of incoming reply packets. For example, the gateway 27 can be set so as to change the source port of all the packets that use a particular protocol, or all the packets having predetermined source or destination addresses.

According to the present invention, the NAT functionality changes the source port of outgoing packets into a value related to a session identifier ("session ID") used in the session database. Every reply packet from the WAN will then have as destination port this value, from which the session ID can be extracted and used to directly point the current session in a session database, thus sensibly reducing the session recognition time.

The access gateway 27 can in particular apply a different session recognition mechanism depending on whether the session is subjected to the "NATting" process of the present invention or not. In particular, the access gateway 27 can apply a session recognition process such as the one disclosed in U.S. Pat. No. 6,816,455 B2 to any outgoing packet and to any incoming packet related to sessions not subjected to the NATting process described in the following, and the fast recognition process of the present invention to the packets related to sessions subjected to NATting according to the present invention.

Figure 2:
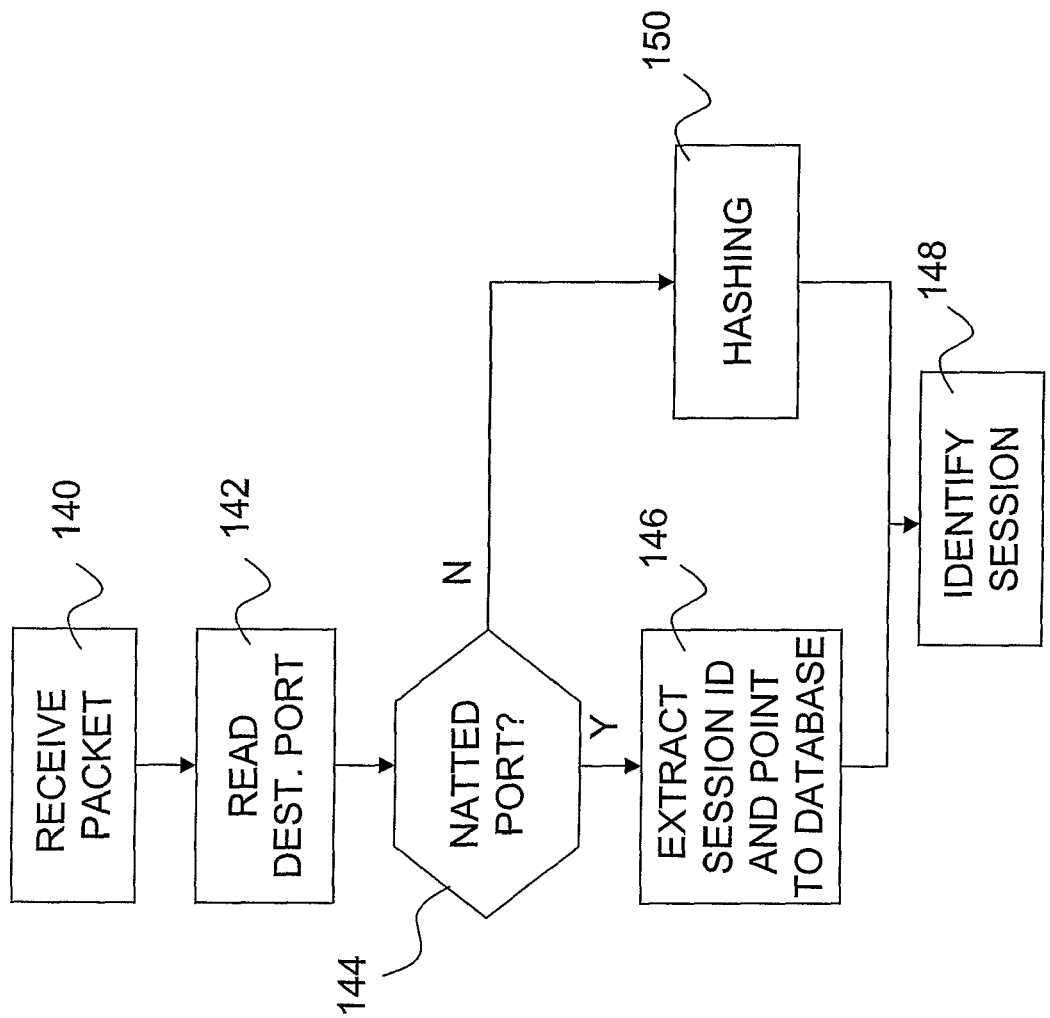
FIG. 2 is a flow diagram showing how received packets are processed.

In particular, for packets received from the WAN, the following process, described with reference to FIG. 2, can be applied. When a packet coming from the WAN 10 is received by the gateway 27 (step 140), the NAT reads its destination port value (step 142) and checks if the port value contains a session ID (i.e. if the packet belongs to a session subjected to NATting according to the present invention) (step 144). The mechanism for understanding if the destination port contains a session ID will be described later. In the affirmative (exit Y from step 144), the session ID is automatically extracted and used to point the session database (step 146) so as to access the current session (step 148). In the negative (exit N from step 144) a hashing process as described in the following is applied by the dynamic filter (step 150) to identify the session (step 148).

Figure 3:
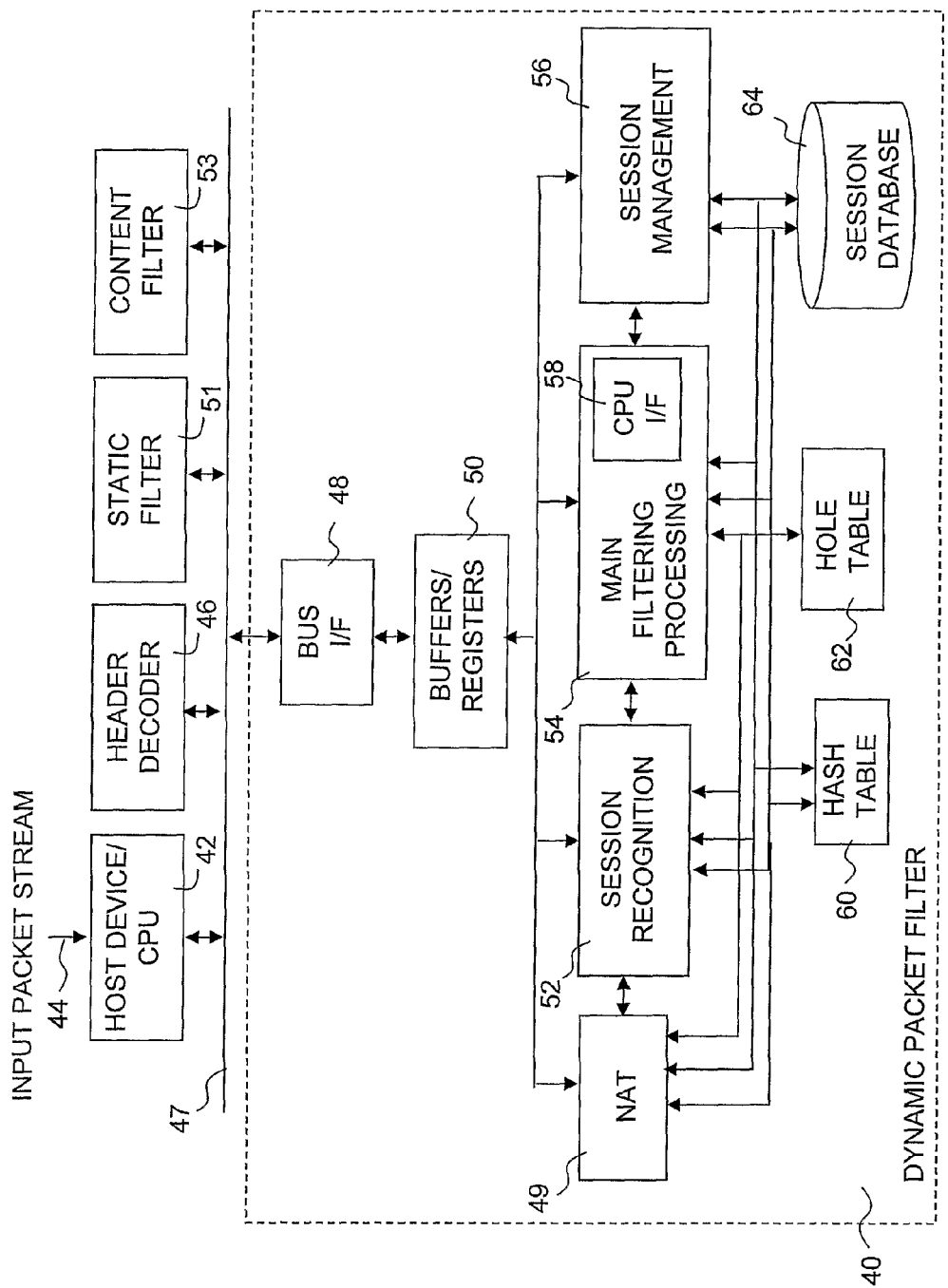
FIG. 3 is a block diagram illustrating the dynamic packet filter of the present invention in more detail.

The dynamic filter will now be described in more detail with reference to FIG. 3. The dynamic filter 40 comprises a bus interface 48, buffer/registers 50, a NAT module 49, a session recognition module 52, a main filter processing module 54, a session management module 56, a hole table 62 and a session database 64. The dynamic filter communicates with a host device/CPU 42, a header decoder 46, a static filter 51 and a content search unit 53 over a bus 47 via the bus interface. It can be appreciated that the NAT module 49 can be alternatively included in other parts of the access gateway 27 and be in communication with the relevant parts of the dynamic filter 40 as requested for the implementation of the method described later.

The main filter processing module 54 comprises a CPU interface 58 and functions as the main processing block of the dynamic filter. It opens new sessions, processes existing sessions and tracks the state of a session while verifying legal, i.e. permitted, state changes in accordance with the particular protocol. The session recognition module 52 functions to receive a socket and search in the session database for an open session matching the socket. The session management module 56 functions to maintain a hash linked list and a least recently used (LRU) linked list whereby sessions are added to and deleted from the lists. The session database 64 functions to store the socket and other session related data, including session state and current status, for use by the various processing modules of the dynamic filter. The hash and hole tables 60, 62 are used to accelerate the recognition of sessions.

When an input packet stream 44 is received from the CPU, the contents thereof are forwarded to the header decoder 46 which functions to decode (or parse) the header portion of the packet. In particular, the header decoder 46 is operative to extract the fields of interest that are used by the NAT module 49 and the session recognition module 52. The data extracted by the header decoder is forwarded to the NAT module 49 and to the session recognition module 52 (over the bus 48). The data sent to the NAT module 49 includes the destination port value, while the data sent to the session recognition module 52 includes 104 bit socket data including 32 bit source and destination IP address, 16 bit source and destination port and 8 bit protocol, dynamic function value indicating the type of layer 4 packet, e.g., ICMP, ARP, TCP, UDP, etc. for the TCP protocol; it also includes 32 bit sequence number, 32 bit acknowledge, 11 bit payload length and 16 bit window size. Note that depending on the implementation, the header decoder may be constructed as an external module or may be integral with the dynamic filter.

Each type of layer 4 packet is represented by a different dynamic function value. This value is used by the dynamic filter to select the appropriate hardware machine to use when processing the received packet so as to track the session state and verify its legality. The payload length is calculated by the header decoder and forwarded to the dynamic filter. It is calculated by subtracting from the total length field in the IP packet, the sum of the IP header and the length in the TCP header.

As already described with reference to FIG. 2, when the NAT module 49 receives the value of the destination port from the header decoder 46, it checks if such value contains a session ID and, in the affirmative, uses the session ID to point the session database, while in the negative it informs the dynamic filter that the session recognition must be performed by the session recognition module 52 by using a hashing technique. Alternatively, the two session recognition processes can be started in parallel and the NAT module 49 can interrupt the process of the session recognition module 52 if it succeeds in the recognition.

Main Filter Processing

The main filter processing will now be described in more detail. The dynamic filter 40 is constructed to process packet data in three stages, wherein session data associated with the packet is read from the session database in one stage, the data are then processed in a second stage and the results of the processing written back to session database in a third stage. During the processing stage, the session state is tracked against predefined rules and a decision is made whether to allow or deny the packet.

Figure 4:
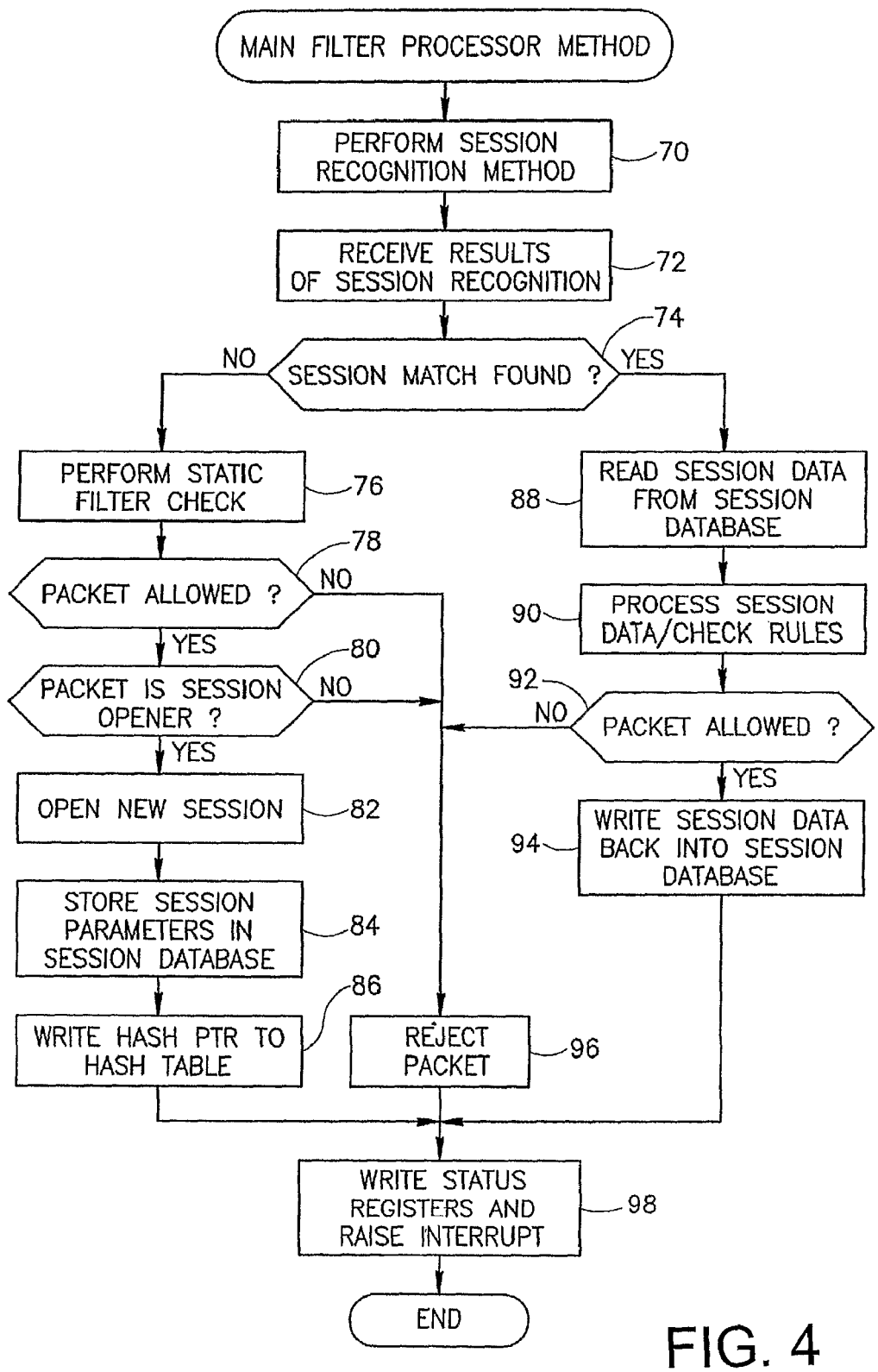
FIG. 4 is a flow diagram illustrating the main filter processor of dynamic filter.

A flow diagram illustrating the main filter processor functionality is shown in FIG. 4. When a packet is received, session recognition is performed (step 70) (by the NAT module 49 or by the session recognition module 52) to find in the session database a socket matching that of the received packet. The results of the recognition are returned to the main filter processor (step 72). If a match was not found (step 74), a static rules check is performed using a static filter (step 76). The static filter, which may or may not be part of the dynamic filter, functions to perform a static check of the received packet against a set of static rules corresponding to different protocols. Packet static rules checking is well known in the communications arts and is therefore not elaborated upon herein.

If the result of the static rules check is to deny the packet, i.e. the packet violates one or more protocol rules (step 78), the packet is rejected (step 96). If the result of the static rules check is to allow the packet, it is checked whether the packet is a session opener (step 80). A packet is a session opener if it is a packet that can logically open a session. For example, a reply packet cannot open a session, a TCP packet must be a SYN packet to open a session, etc. If the packet is not a session opener, it is rejected (step 96).

If the packet is a valid session opener, a new session is created (step 82). The session related data and parameters are stored in the session database (step 84). A hash pointer to the new session is then calculated and stored in the hash table (step 86). The hash pointer is used to quickly find the session during the recognition stage.

If a session having a socket matching that of the received packet is found (step 74), the session data is read from the session database (step 88) and the session data then processed (step 90). The dynamic rules associated with the particular packet protocol are checked and a determination of whether to allow or deny the packet is made. The session state is tracked and checked against the permitted behavior for the particular protocol. In accordance with the invention, the dynamic rule checking is performed in hardware rather than software. Alternatively, the dynamic rules may be checked via software means as well.

If the packet is denied (step 92), the packet is rejected (step 96). If it is allowed, the updated session data with the updated session tracking state is written back into the session database (step 94).

Following either a session opener, rejection of a packet or an allowance of a packet, one or more status registers are written to and an interrupt is raised signaling the completion of the main filter processing to the CPU or other host device (step 98).

Figure 5:
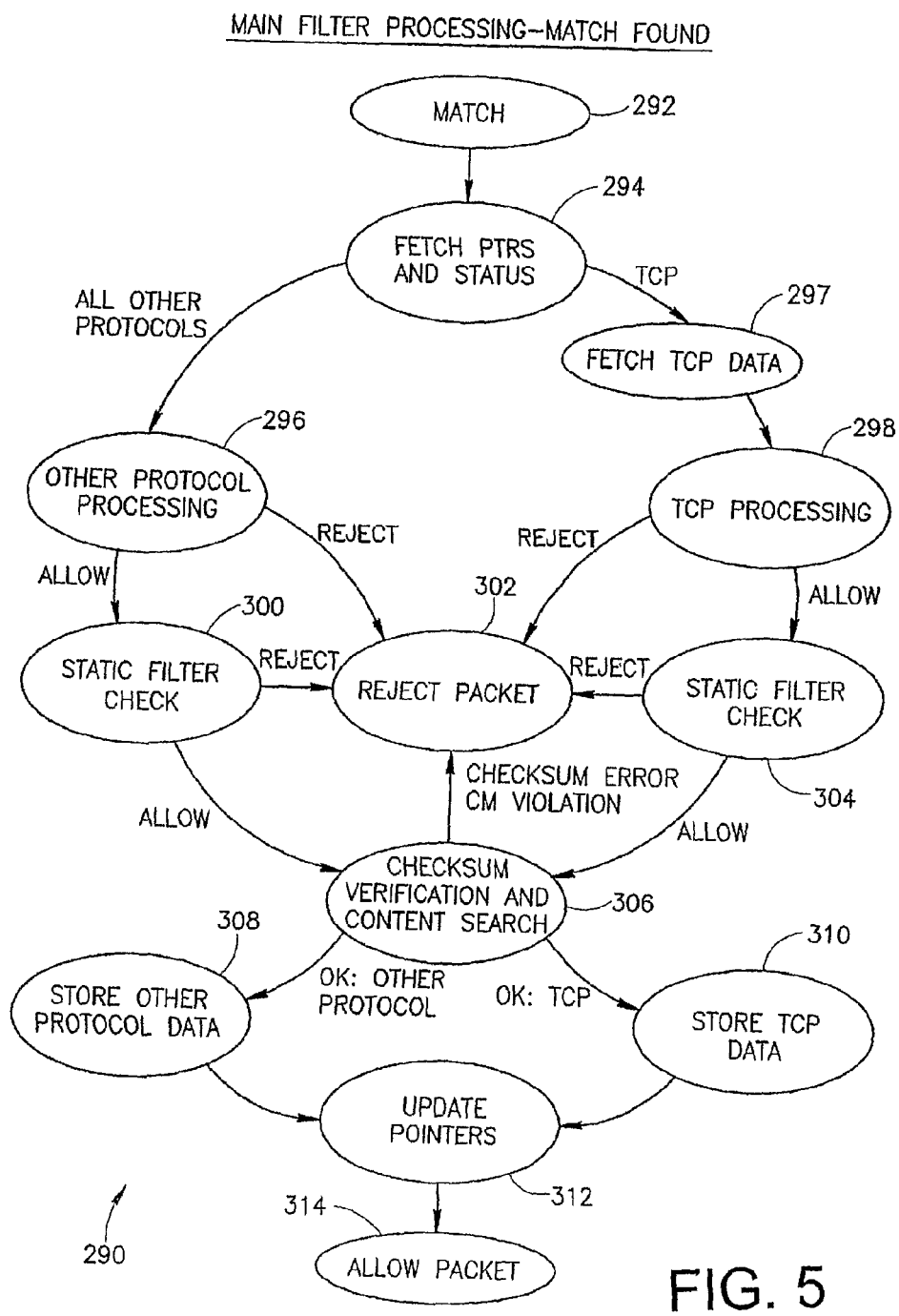
FIG. 5 is a state transition diagram illustrating the main filter processor operations when a match is found.

A state transition diagram illustrating the main filter processor method when a match is found is shown in FIG. 5. The state transition diagram, generally referenced 290, comprises a plurality of transitions and states that implement the logic of the main filtering processing when a match is found. The process begins in the match state 292 and moves to the fetch pointers and status state 294. In this state the pointer and status data associated with the session are fetched.

If the session is a TCP session, the TCP related data is fetched from the session database (state 297). The process then moves to the TCP processing state 298. The processing performed comprises tracking the TCP session state and checking whether the session behavior is legal, as described in more detail infra. The packet may be rejected (state 302) or allowed wherein processing continues with waiting for the static filtering check to complete (state 304). The static filtering is performed outside the dynamic filter using any well known static filtering technique. The static filter check may reject the packet (state 302) or may allow the packet whereby the process waits for the content machine to complete searching the payload for valid strings and waits for the checksum verification to complete (state 306). If the checksum verification passed and a valid string was found, the TCP parameters are updated and stored in the session database (state 310). The session pointers are then updated (state 312) and the packet allowed (state 314). If the checksum verification returns a checksum error or the content machine finds an invalid string, the packet is rejected (state 302). Invalid strings comprise strings found by the content machine that are not permitted for one or more reasons, e.g., they indicate the presence of virus, non-permitted commands such as the FTP DELETE command, etc. Valid strings comprise either permitted strings or no matching strings. A content machine suitable for use with the present invention is described in more detail in U.S. application Ser. No. 09/790,064, filed Feb. 21, 2001, entitled "Apparatus for and Method of Multiple Parallel String Searching," similarly assigned and incorporated herein by reference in its entirety.

Similar processing is performed for protocols other than TCP. If the session is a non-TCP session (e.g., UDP, ARP, ICMP, etc.), the other protocol processing state 296 is entered. The processing performed comprises tracking the connection state and checking whether the session behavior is legal for the particular protocol, as described in more detail infra. The packet may be rejected (state 302) or allowed wherein processing continues with waiting for the static filtering check to complete (state 300). The static filter check may reject the packet (state 302) or may allow the packet whereby the process waits for the content machine to complete searching the payload and waits for the checksum verification to complete (state 306). If the checksum verification passed and a valid string was found, the parameters of the particular protocol are updated and stored in the session database (state 308). The session pointers are then updated (state 312) and the packet allowed (state 314). If the checksum verification returns a checksum error or the content machine finds an invalid string, the packet is rejected (state 302).

Figure 6:
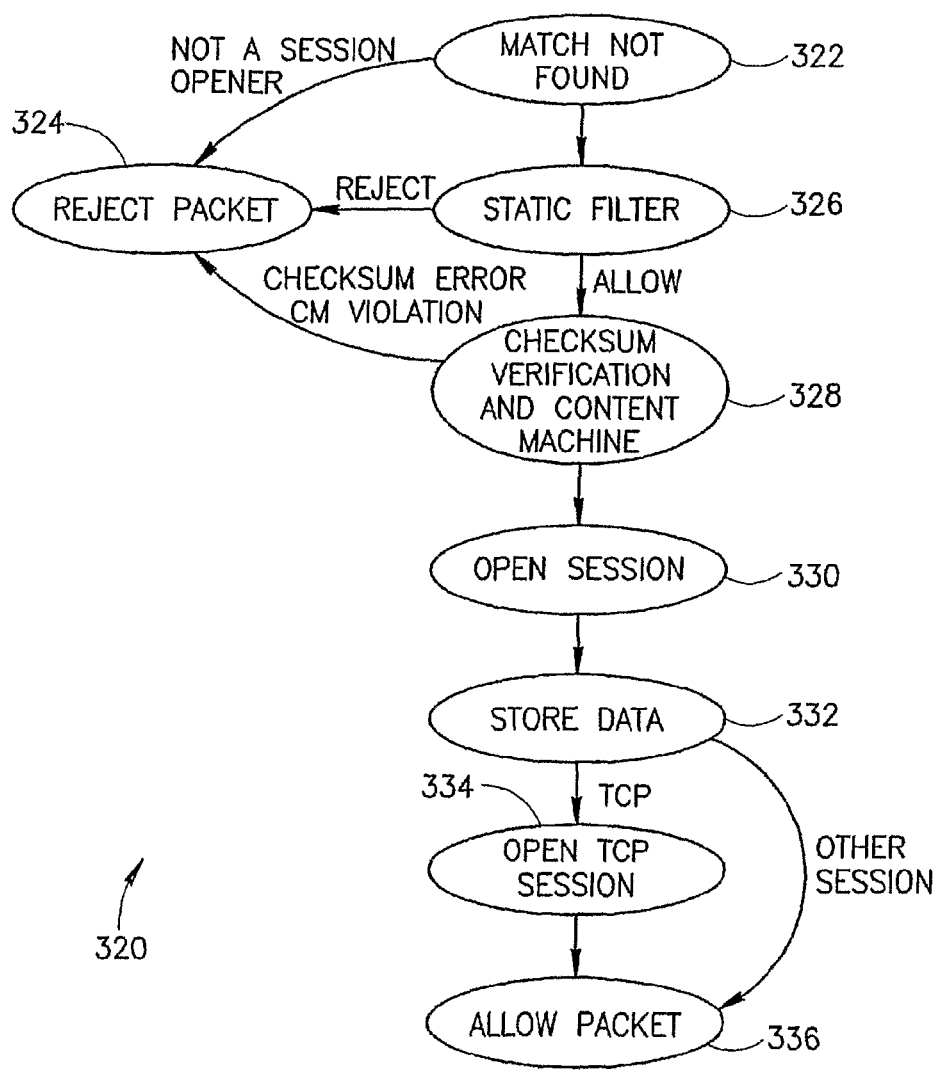
FIG. 6 is a state transition diagram illustrating the main filter processor operations when a match is not found.

A state transition diagram illustrating the main filter processor method of the present invention when a match is not found is shown in FIG. 6. The state transition diagram, generally referenced 320, comprises a plurality of transitions and states that implement the logic of the main filtering processing when a match is not found. The process begins in the match not found state 322 and moves to the wait for static filter determination state 326 if the session is a session opener. If the session is not a session opener, the packet is rejected (state 324).

If the static filter allows the packet, the process waits for the content machine and for the checksum verifier to complete checking (state 328), otherwise the packet is rejected (state 324). If the content machine check finds an invalid string or the checksum verification reveals a checksum error, the packet is rejected (state 324). If the checksum verification and content machine search completes without errors, a session is opened and the socket data is stored in the session database (state 330). The status, timestamp and state of the connection are also stored in the session database (state 332). If the session is a non-TCP session, the packet is allowed (state 336). In the case of a TCP session, a TCP session is opened (state 334) and the packet then allowed (state 336).

The dynamic filter is suitable for implementation in hardware adapted to perform session tracking processing in parallel for all supported protocols. During fetching of the session data in the event of a socket match, the data previously fetched is processed in parallel. Once the data is fetched, all session checking for the various protocols is performed in a single clock cycle. Thus, the hardware implementation of the invention greatly accelerates the packet filtering process.

Session Recognition

The session recognition process performed for incoming packets not "NATted" (i.e. not subjected to a change of the source port by the NAT) and for outgoing packets will now be described in more detail.

Figure 7:
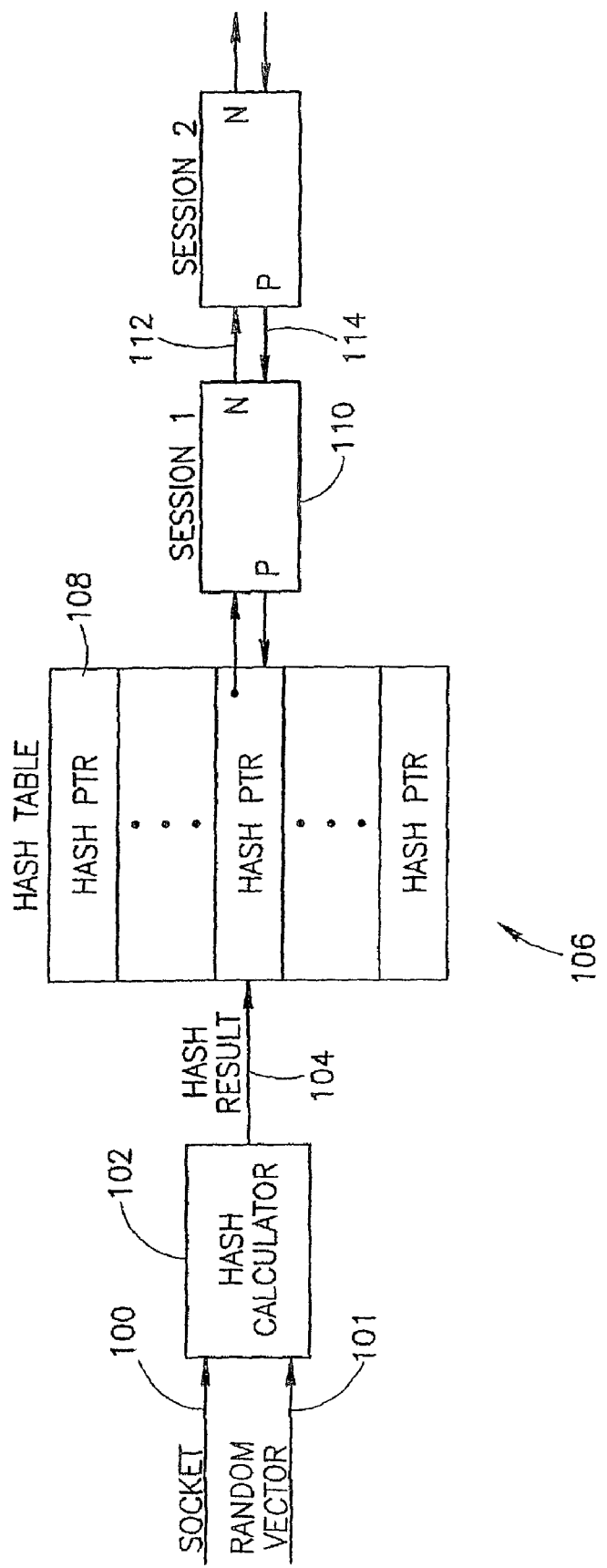
FIG. 7 is a flow diagram illustrating the hashing method of the session recognition process.

A diagram illustrating the hashing technique of determining the session associated with an input packet is shown in FIG. 7. Each session corresponds to a unique socket. A session is identified by comparing the received packet's socket to the sockets associated with previously opened sessions stored in the session database. To speed the recognition of a session, a hash table is used which stores hash pointers to session records in the session database and permits rapid lookup of the session corresponding to a received socket.

New sessions are stored in the session database and a hash on the socket is calculated, either by the dynamic filter or the CPU. A hash pointer is stored at a location in the hash table 60 (FIG. 3) pointed to by the hash result. If more than one session is stored at that location, the session is added to a linked list. Note that initially, each entry in the hash table is initialized to NULL.

Upon receipt of a packet, the socket 100 is input to the hash calculator 102 which functions to generate and output a hash result 104. The hash result is used as the index to the hash table 106 that comprises a plurality of entries 108 each containing a hash pointer. The hash pointer points to a linked list of sessions 110 in the session database. Each session record in the session database comprises previous 114 and next pointers 112 thus implementing a doubly linked list. If a hit on the socket occurs, each session in the linked list must be checked for a match with the socket of the received packet.

Preferably, the hash function is chosen to produce as even a spread as possible of hash results across the hash table. The hash function may be any suitable function, such as an XOR function or CRC.

Figure 8:
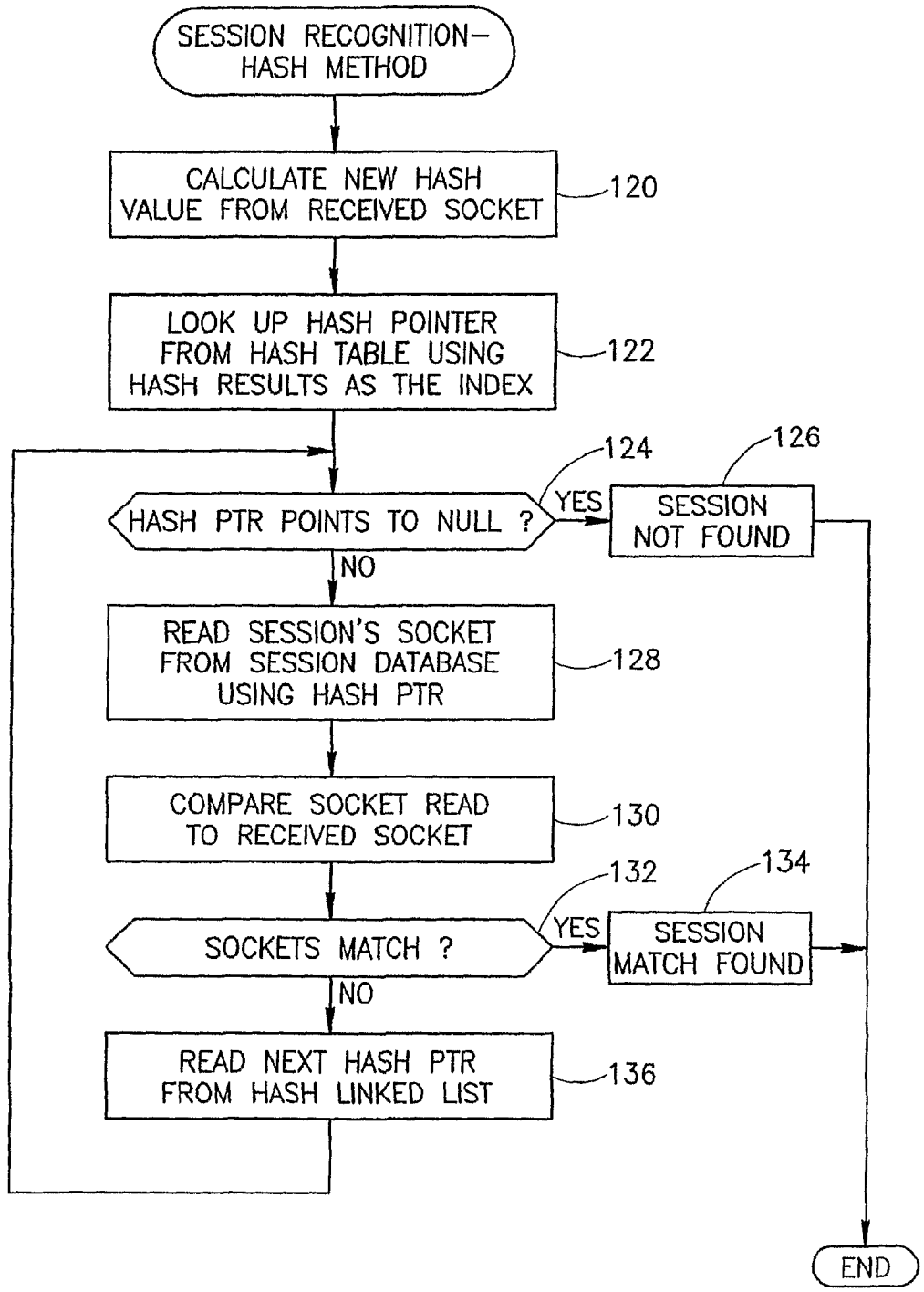
FIG. 8 is a flow diagram illustrating the session recognition process.

A flow diagram illustrating the session recognition process of the present invention is shown in FIG. 8.

The first step is to calculate a hash value from the socket in the received packet such as in the manner described above (step 120). The R byte hash result is used as the index into the hash table to retrieve the hash pointer corresponding to the socket (step 122). If the hash pointer points to NULL (step 124), then there is no session and 'session not found' is returned to the main filter process (step 126).

If the hash pointer is not NULL, the session's socket is read from the session database (step 128) and compared to the socket in the received packet (step 130). If the sockets match (step 132), a session match is found (step 134) and reported to the main filter process. If the sockets do not match (step 132), the next hash pointer is read from the linked list (step 136) and the method repeats from step 124 until either the last hash pointer points to NULL or a match is found.

Note that a full compare on the socket is always performed even in the event only one session is stored in the linked list. Note also that the scope of the invention is not limited by which entity updates and maintains the linked list, i.e. either the dynamic filter or the CPU. The depth of the hash table can be any desired value. Typically, however, the depth is set in accordance with the number of sessions to be tracked simultaneously. Preferably, the number of hash entries is two or four times the number of sessions since it is not desirable to have many duplicates due to the time consuming nature of the full socket compare.

The session recognition module comprises the capability of searching for sessions using partial socket data. Partial socket data, termed a hole, comprises any socket wherein one or more items of information are missing, i.e. any combination of one or more of the five elements making up a socket (source and destination IP address, source and destination port and protocol). A hole refers to an opening made in the firewall/dynamic filter to allow subsequent packets to pass through even though they will not pass the static filter rule base. A packet associated with a hole may have zero or more parameters missing in its associated socket. Sockets with one or more missing parameters are placed in a hole table and a hole search is performed.

The hole search method is a secondary search method performed by the session recognition module in response to not finding a session match using the complete socket matching method previously described. Holes are not desirable and once established, the CPU and dynamic filter attempt to 'fill' them upon receipt of the first packet yielding a partial socket match. A detailed description about use of holes and hole search method can be found in U.S. Pat. No. 6,816,455 B2.

Session Database

The session database 64 (FIG. 2) will now be described in more detail. As described supra, the session database functions to store session related data for a plurality of sessions, each session being identified in the database by a respective session ID. The size of the session database may vary depending on the implementation and the system requirements. The fields making up each record of the database are listed below in Table 1.

TABLE 1

Session database record fields

| Field No. | Field Description | Length (bits) |
|---|---|---|
| 1 | Local IP address | 32 |
| 2 | Remote IP address | 32 |
| 3 | Protocol | 8 |
| 4 | Local port/ICMP Seq. No./IP identification | 16 |
| 5 | Remote port/type and code/NULL | 16 |
| 6 | Next hash pointer | 16 |
| 7 | Previous hash pointer | 16 |
| 8 | Next LRU pointer | 16 |
| 9 | Previous LRU pointer | 16 |
| 10 | Number of children | 16 |
| 11 | Session status | 16 |
| 12 | Local MAC address | 48 |
| 13 | LAN ACK above change | 8 |
| 14 | LAN sequence above change | 8 |
| 15 | WAN ACK above change | 8 |
| 16 | WAN sequence above change | 8 |
| 17 | LAN ACK below change | 8 |
| 18 | LAN sequence below change | 8 |
| 19 | WAN ACK below change | 8 |
| 20 | WAN sequence below change | 8 |
| 21 | LAN sequence and ACK change threshold | 32 |
| 22 | WAN sequence and ACK change threshold | 32 |
| 23 | Expected LAN ACK | 32 |
| 24 | Expected WAN ACK | 32 |
| 25 | Maximum LAN sequence | 32 |
| 26 | Maximum WAN sequence | 32 |
| 27 | Maximum LAN window size | 32 |
| 28 | Maximum WAN window size | 32 |
| 29 | Connection state | 32 |
| 30 | Timestamp | 32 |

TABLE 1-continued

Session database record fields

| Field No. | Field Description | Length (bits) |
|---|---|---|
| 31 | LAN initial sequence | 32 |
| 32 | WAN initial sequence | 32 |
| 33 | Parent session pointer | 16 |
| 34 | First child pointer | 16 |
| 35 | Next brother pointer | 16 |
| 36 | Previous brother pointer | 16 |

Fields 6 and 7 store the next and previous hash pointer within the hash linked list described supra. The hash linked list is used during session recognition of a packet. Fields 8 and 9 store next and previous LRU pointers in a LRU linked list used to order sessions in terms of staleness. The LRU linked list operation is described in more detail infra. Field 10 stores the number of children. This field is used in the case where the application associated with this session required the opening of additional sessions. Each session (i.e. child session) opened increments the number of children.

The dynamic filter also comprises a session status register for conveying status related information to and from the CPU. The session status comprises a plurality of bits as shown below in Table 2.

TABLE 2

Session status bits

| Bit name | Description |
|---|---|
| USD | indicates whether the session record is being used (i.e. valid or not) |
| STR | indicates which side initiated the session, i.e. LAN or WAN |
| HSH | indicates this session is the first in the hash linked list |
| NAT | indicates whether this session is a network address translation (NAT) session |
| ARP | indicates address resolution protocol (ARP) NAT session |
| FRG | indicates session is a fragmented IP session |
| UCM | indicates that this session was marked by the CPU; the CPU is notified by a status bit upon each packet that belongs to this marked session |
| FRE | indicates family relations exist |
| HLD | indicates the session cannot be closed regardless of timeouts, etc. |
| PSV | indicates passive session, i.e. no timestamp updating, no packet is allowed to pass through this session |
| NOC | indicates notify on closing of a session, i.e. generate interrupt |
| SBP | indicates session bypass, i.e. no dynamic filtering, only timestamp updating |
| CSH | indicates stop all traffic for this session (e.g., if HLD flag set), while keeping the session alive (i.e. updating LRU and timestamp upon incoming packet but not allowing it) |

Note that the following flags are set by the CPU and used by the dynamic filter: UCM, FRE, HLD, PSV, NOC, SBP, CSH.

Fields 12 to 22 are used for network address translation purposes. Fields 23 to 28 and 31 to 32 are all TCP related fields and used in processing and tracking TCP packets. Field 29 stores the connection state for all protocol types. The connection state parameter is a value representing the current state of the connection. Different values are used for different protocols. As an illustrative example, the connection states for several protocols are listed below in Table 3.

TABLE 3

Connection states

| Protocol | State |
| --- | --- |
| TCP | LanRequestedTCPConnection |
| | WanRequestedTCPConnection |
| | LanAcceptedTCPConnection |
| | WanAcceptedTCPConnection |
| | OpenTCPConnection |
| | CloseTCPByLanRst |
| | CloseTCPByWanRst |
| | CloseTCPByFin |
| | WanSentFin__LanSentFin |
| | WanSentFin |
| | WanAckedLanFin |
| | WanAckedLanFin__WanSentFin |
| | LanSentFin |
| | LanAckedWanFin |
| | LanAckedWanFin__LanSentFin |
| General | HoleLanToWan |
| | HoleWanToLan |
| | HoleBothSides |
| UDP | OpenUDPConnection |
| ARP | OpenARPConnection |
| ICMP (echo) | OpenICMPConnection |
| IP | OpenIPConnection |
| NULL | NullState |
| ICMP error | ClosebyLanICMPError |
| | ClosebyWanICMPError |

Field 30 stores the timestamp used to age a session. Time is represented in 16 bits and stored as a time difference or delta in accordance with the particular protocol. Periodically, the CPU instructs the session management module to perform session aging whereby sessions that have aged out are closed.

Fields 33-36 are used to store pointers to sessions related to this session. Various family information is stored in the session database including brother, child and parent information.

Session Management

The session management module 56 is operative to maintain a linked list for storing the sessions in least recently used order. The session management module 56 performs several functions relating to maintenance and control of the session database 64. The session management module functions to check the validity of timestamps (i.e. aging) of sessions stored in the session database upon command from the CPU. When the command to perform aging is received, the timestamp field of each record in the session database is examined and those records whose time limit has expired are closed. Aging is performed on the sessions in order to flush sessions that become stale and that were not closed normally for some reason. For example a session may age out if it corresponds to a packet that violated a rule.

The session management module 56 also functions to provide an unused (i.e. empty and available) session to the CPU or to the main filter processing 54 (FIG. 3) upon request. In operation, the CPU/main filter processing module 58 requests a new session and the session management module 56 searches for one and returns the index to the CPU/main filter processing module 58 respectively. Similarly, the session management module 56 also gracefully disconnects a session that is in use when required, i.e. aging CPU request, main filter processing request, etc. The session management module 56 also opens new sessions wherein LRU pointers and hash pointers in the hash table and session database are updated. The sessions are organized in a Least Recently Used (LRU) double linked list: the session stored in the head of the list (LRU session) is the one not used for the longest time; the session stored in the tail of the list is the Most Recently Used one (MRU session). The position of the sessions in the list is changed by the hardware according to the characteristics of the filtered traffic flows.

In short, when a packet is received, three different cases can happen:

A matching session is found: if dynamic rules allow the packets, the session is moved in the tail of the list (i.e., it becomes the Most Recently Used session, as described in the following).

No matching session is found and the packet is not a session-opener, since static rules deny it: no action occurs.

No matching session is found and packet is a session-opener, i.e. it is allowed by static rules: a new session is opened using the LRU session and placed in the tail of the LRU list.

Figure 9:
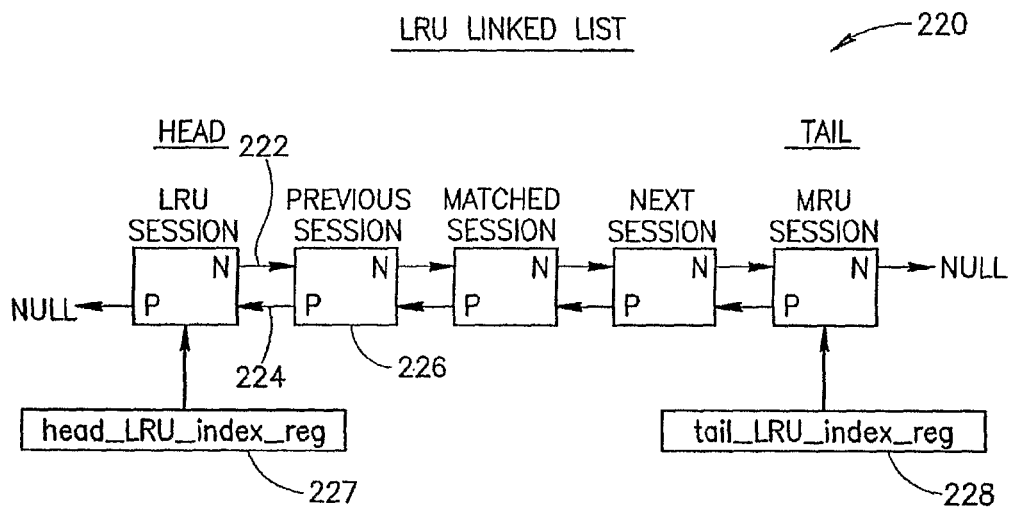
FIG. 9 is a diagram illustrating the least recently used link list structure used to track the session staleness.

The least recently used (LRU) link list structure used to track session use is shown in FIG. 9, where each session is represented by a block. Every time a session is recognized (i.e. accessed), and the corresponding packet is allowed by the main filter processing, the session is placed at the tail of the LRU linked list. The doubly linked list, generally referenced 220, comprises a plurality of sessions 226 each having a next LRU pointer 222 and a previous LRU pointer 224. The session at the tail of the LRU linked list is pointed to by the contents of a tail_LRU_index_reg register 228. The session pointed to by this register represents the most recently used (MRU) session. The session at the head of the LRU linked list is pointed to by the contents of a head_LRU_index_reg register 227.

The session management module 56 also updates and maintains the family relations upon closing a session, as described in more detail infra.

The LRU linked list is used to determine, in the event the session database 64 is full, which session to remove when a new session is added. In this case, the least recently used session is closed and the record used to store the new session.

For efficient implementation of the dynamic packet filter the hardware is responsible for handling of LRU list: it automatically extracts and inserts sessions after successful session lookup. When the system needs to open a new session, it performs a "Get Unused" (GUS) command: the LRU session is removed from the LRU list and its fields are cleared. While in this pending state, the session can be updated with new socket fields (for instance by an ALG software). A following "INS" command is then used to insert the pending session in the tail of LRU list (as MRU session).

Figure 10:
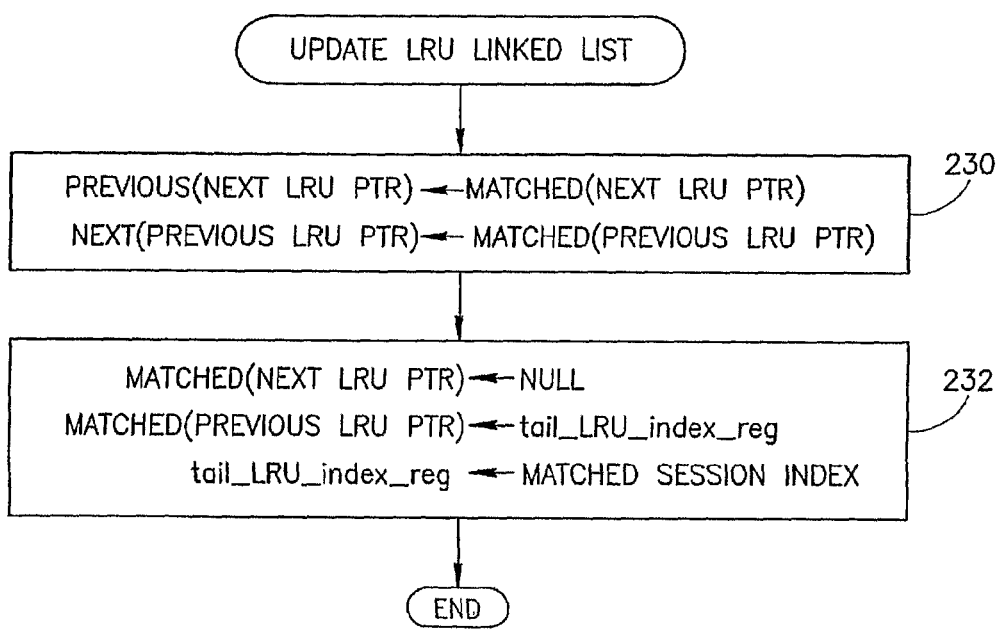
FIG. 10 is a flow diagram illustrating the method of updating the LRU linked list upon recognition of a session associated with an input packet.

A flow diagram illustrating the method of updating the LRU linked list upon recognition of a session associated with an input packet is shown in FIG. 10. The update method is performed every time a matching session is accessed and the corresponding packet allowed. With reference again to FIG. 9, wherein sessions labeled Previous session, Matched session and Next session are shown, the matched session is moved from its location in the list to the tail to become the most recently used session. The matched session is removed by: (1) setting the next LRU pointer 222 of the Previous session to the next LRU pointer 222 of the Matched session and (2) setting the previous LRU pointer 224 of the Next session to the previous LRU pointer 224 of the Matched session (step 230).

The Matched session is then made the most recently used by: (1) setting the next LRU pointer of the Matched session to NULL, (2) setting the previous LRU pointer of the Matched session to the contents of the tail_LRU_index_reg register and (3) setting the tail_LRU_index_reg register to the index of the Matched session (step 232).

Figure 11:
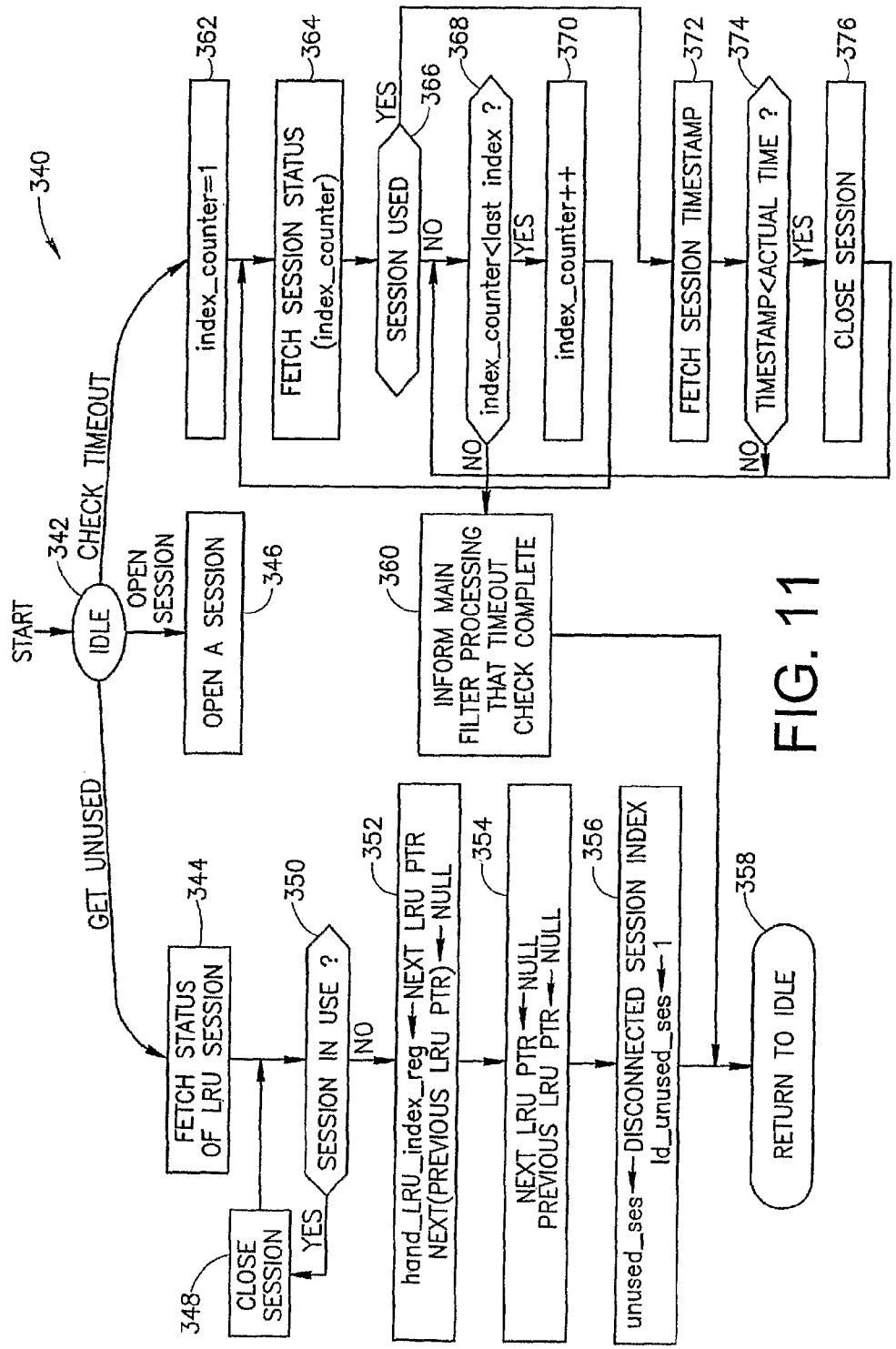
FIG. 11 is a flow diagram illustrating the processing of the session management process.

A flow diagram illustrating the processing operations of the session management module 56 is shown in FIG. 11. The session management processing begins in the idle step 342 and moves to the next step depending on the event. In the case of "Get Unused" instruction from the CPU or main filter processor, the status of the least recently used session is fetched (step 344). If the session is in use (step 350); the session is then closed (step 348). If the session is not in use, the head_LRU_index_reg is set to the next LRU pointer of the least recently used session and the next (previous LRU pointer) is set to NULL (step 352). The next and previous LRU pointers of the session removed are then set to NULL, thereby removing the least recently used session from the LRU linked list (step 354). The unused_ses variable is set to the session just disconnected and the flag to inform the CPU or the main filter processing accordingly is set to '1' (step 356). The process then returns to Idle (step 358).

A 'check timeout' command from the CPU causes the session manager to begin checking timeouts of the sessions. The index_counter is incremented (step 362) and the status of a session is fetched (i.e. the index_counter) (step 364). If the session is currently in use (step 366), the session timestamp is fetched (step 372). If the timestamp is greater than the actual time (i.e. the session has aged out) (step 374), the session is closed (step 376).

If the session is not used or if the session has not aged out, it is checked whether the index_counter is less than the last index (step 368). If it is, the index_counter is incremented (step 370) and the method continues with step 364. If it is not, the timeout check is complete, the main filter processing is informed (step 360) and the method returns to Idle (step 358).

Figure 12:
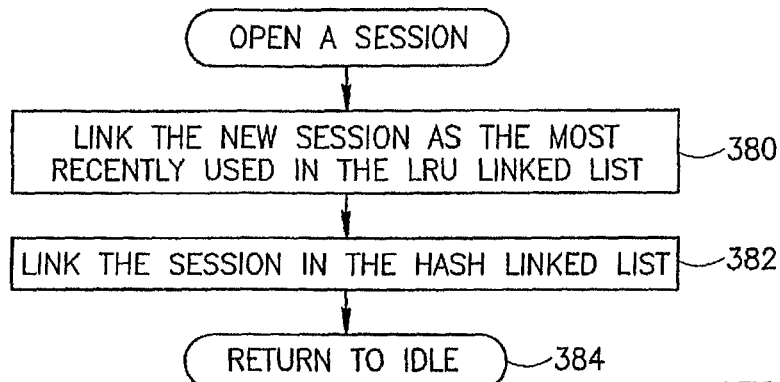
FIG. 12 is a flow diagram illustrating the processing performed by the session management module to open a session.

A flow diagram illustrating the processing performed by the session management module to open a session is shown in FIG. 12. When a session is opened, it is placed at the tail of the LRU linked list (step 380). The session is also placed in the appropriate place in the hash linked list (step 382). The method then returns to the Idle state (step 384).

Figure 13:
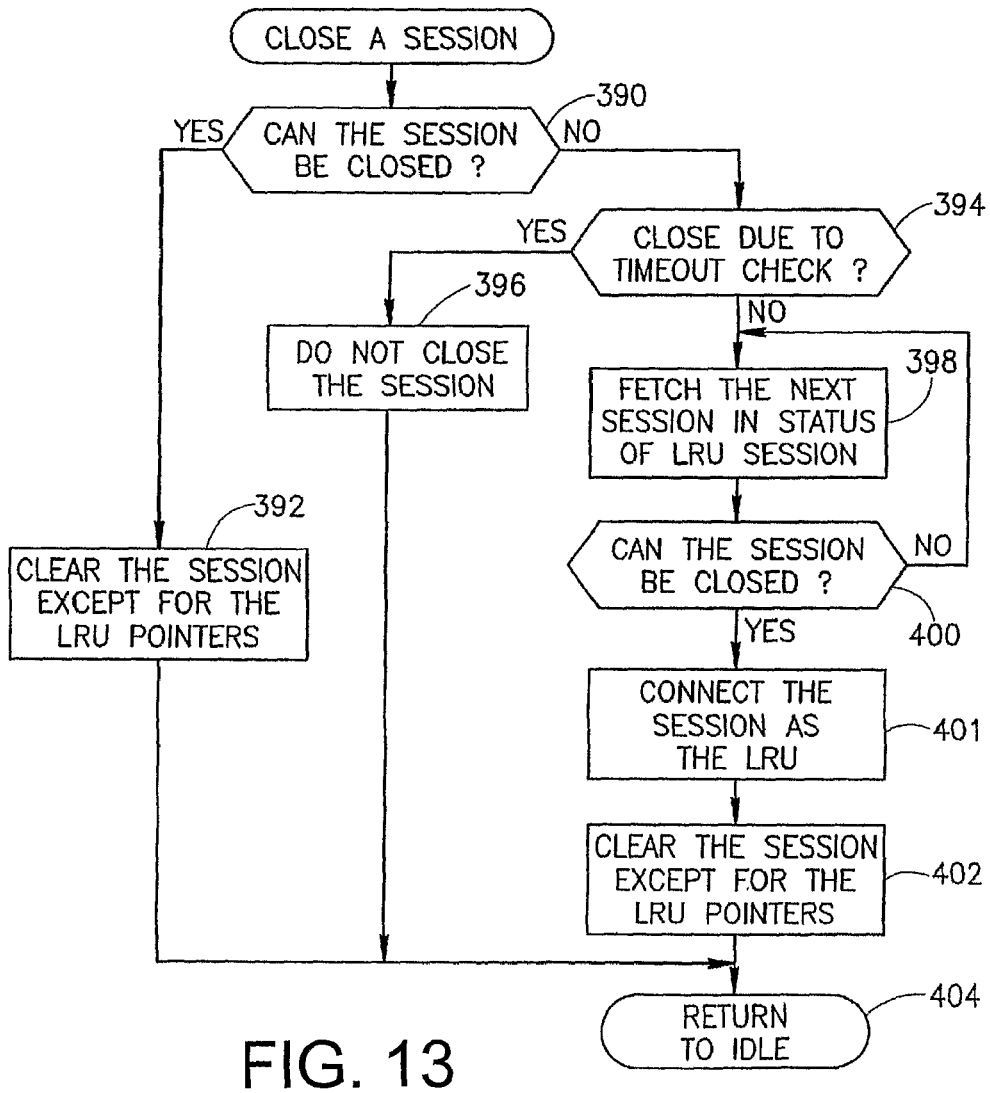
FIG. 13 is a flow diagram illustrating the processing performed by the session management module to close a session.

A flow diagram illustrating the processing performed by the session management module 56 to close a session is shown in FIG. 13. If the session is closable as specified by the HLD flag (step 390), the session is cleared without modification of the LRU pointers (step 392). The method then returns to the Idle state (step 404).

If the session cannot be closed (step 390), and the request to close was due to a timeout check (step 394), the session is not closed (step 396) and the method returns to the Idle state (step 404). If the close request was not due to a timeout check, the next session pointed to by the least recently used session is fetched (step 398). If this session cannot be closed (step 400), the method continues with step 398 and the process repeats until a session is found that can be closed. If a session that can be closed is found (step 400), the session is configured as the LRU (step 401). The session is then cleared except for the LRU pointers (step 402) and the method then returns to the Idle state (step 404).

NAT Functionality

As previously stated, the NAT functionality introduces a security level in the communication by hidding the IP source address of outgoing packets. In particular, a NAT is typically designed to mask a set of private IP addresses with its own public address (the same mechanism is extensible to many public IP addresses) using a different transport port (TCP or UDP) for each different connection.

In addition, according to the present invention, the NAT module performs an additional task, aimed at reducing the time of processing of incoming packets. This additional function will be described in detail below.

The NAT functionality can be static or dynamic. The following explanation focuses on the dynamic type.

Figure 14:
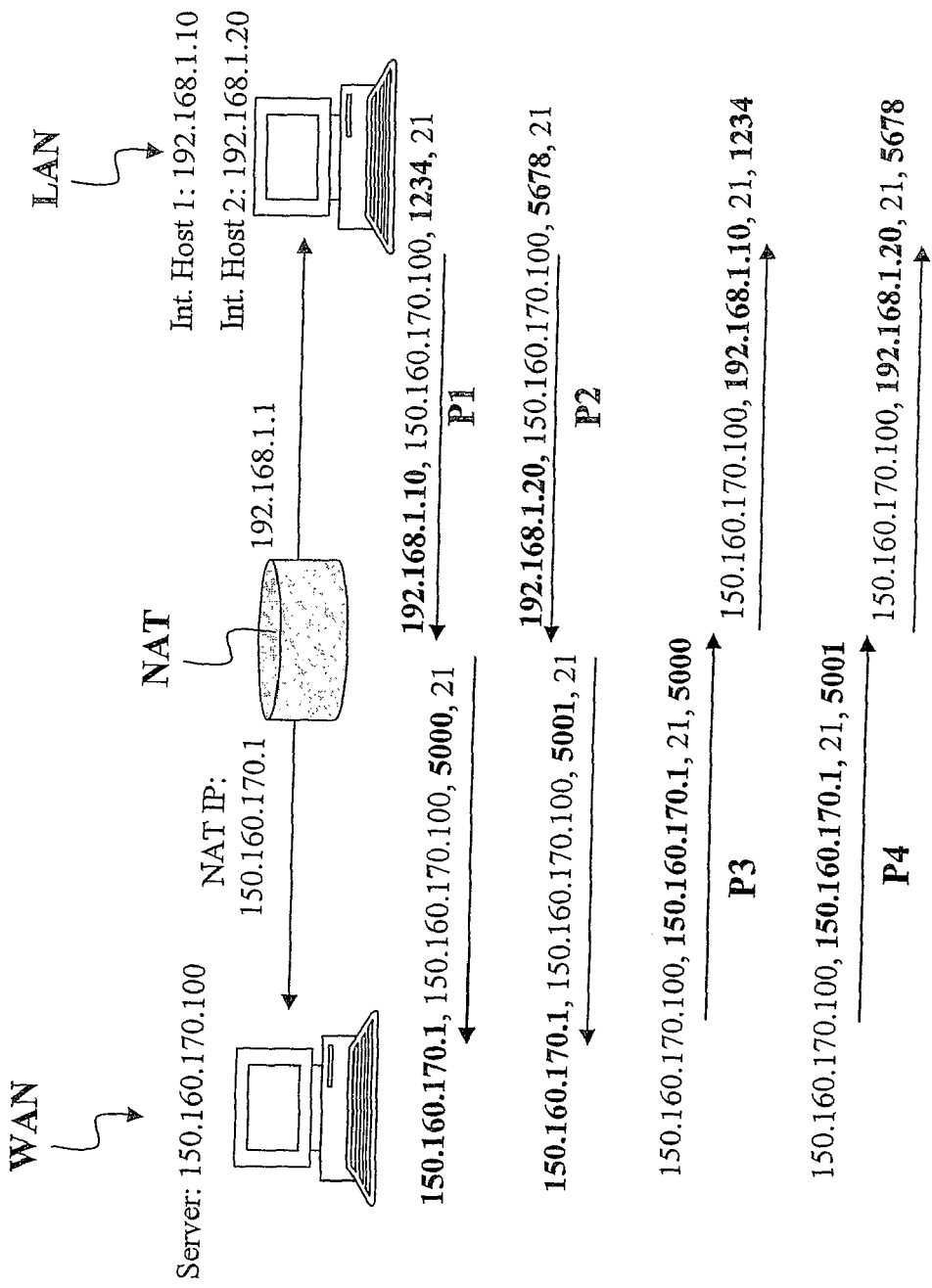
FIG. 14 shows an example of operation of a NAT of a known type.

In FIG. 14 it is illustrated the behavior of a typical NAT connected between a WAN and a LAN. Each packet is identified by four fields:
Source IP address (SRC-IP);
Destination IP address (Dest-IP);
Source Port (Src-Port);
Destination Port (Dest-Port).

A connection is identified by five fields: the four indicated above and the protocol identifier. The NAT has its own address (NAT IP address) and port (NAT port). In the example the outgoing (from LAN to WAN) packets (P1, P2) have their source IP addresses (e.g., 192.168.1.10, 192.168.1.20) replaced by the NAT IP address (e.g., 150.160.170.1) and their source ports (e.g. 1234, 5678) replaced by a specific NAT port that is different for each connection (e.g., 5000, 5001).

The port is dynamically assigned to a connection (session) when the first outgoing packet (session-opener packet) of the connection is intercepted by the NAT module. Once an outbound packet of a new connection reaches the gateway, the NAT module dynamically chooses a port value for this connection from the available port values belonging to a set of port that is configurable by the user. The port value is then used by the NAT module in order to distinguish incoming replies (P3, P4) and perform the right inverse translation of ports and addresses.

For its nature, the dynamic NAT mechanism can work only if the first packet of the connection is an outbound packet. In other words the dynamic NAT is able to handle only connections originated in the internal network; differently, static NAT can be used for handling connections originated in the external network.

According to the present invention the NAT module changes the source port of outgoing packets into a particular value that allows very fast processing of incoming reply packets, as described in the following. When the first outbound packet of a new connection reaches the gateway, the dynamic filter opens a new session with an ID corresponding to the first free position in the session database. At this point, if the packet has to be "NATted" according to the configuration policies, the NAT port is chosen in the following way:

$$\text{NAT Port} = \text{NAT Offset} + \text{Session ID}$$

where the NAT Offset is a value configurable by the user, while the session ID value is returned by the dynamic filter. Accordingly, reply packets received from the WAN will have this same value as destination port.

This formula links the value of the NAT port to the array index of the session of the considered packet. The association is very useful when reply packets belonging to the same session are received from the external network. In this case the NAT module first checks if the value of the destination port is higher than the NAT Offset (step 144 of FIG. 2). In the negative, the session recognition process performed by the NAT is aborted, while in the affirmative the NAT module uses the destination port of the packet (i.e. the NAT port), decremented by the fixed NAT offset, to index the proper session in the session database.

This solution allows not performing all the session finding process using hash tables as described in FIG. 7. In particular, considering the flow-chart described in FIG. 8 the proposed invention allows, for data packets received from the WAN and belonging to sessions subjected to the NATting process of the present invention, to jump directly to the block identified as 128 without performing all the previous steps (120, 122, 124).

The above solution is herein below illustrated with reference to a specific example (in the picture the session ID is reported along with the packet fields for making clear the used approach but it is only a parameter used internally in the NAT/firewall device and not present in the packet header).

Figure 15:
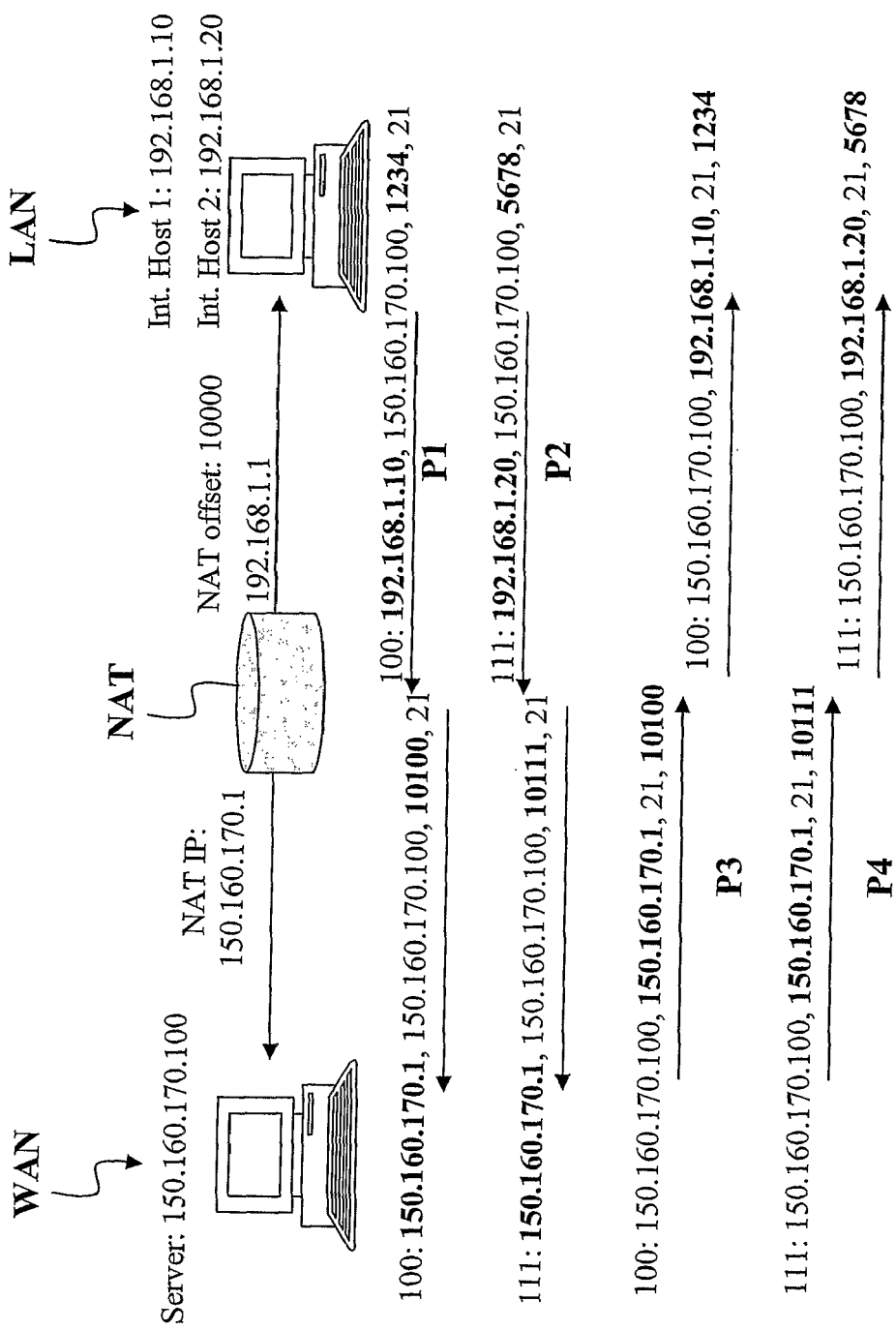
FIG. 15 shows an example of operation of a NAT according to the present invention.

With reference to FIG. 15, the telecommunication system comprises:
- a WAN server with IP address 150.160.170.100;
- a LAN with a first internal host (where "host" here means a data packet transmission/reception apparatus, for example a personal computer, connected to the LAN) having IP address 192.168.1.10 an a second internal host having IP address 192.168.1.20; and
- a gateway including a NAT having IP address 150.160.170.1 and a NAT offset of 10000.

The first and the second internal hosts transmit respective packets P1, P2, identified by the following parameters:
Packet P1:
Session ID: 100
Source IP address (SRC-IP): 192.168.1.10 (internal host 1);
Destination IP address (Dest-IP): 150.160.170.100;
Source Port (Src-Port): 1234;
Destination Port (Dest-Port): 21.
Packet P2:
Session ID: 100
Source IP address (SRC-IP): 192.168.1.20 (internal host 2);
Destination IP address (Dest-IP): 150.160.170.100;
Source Port (Src-Port): 5678;
Destination Port (Dest-Port): 21.

The two packets are processed by the dynamic filter of the gateway, which changes the source IP address into the NAT address and the source port into the NAT port, as follows:
Packet P1:
Source IP address: 192.168.1.10→150.160.170.1 (NAT IP address)
Source Port: 1234→10100=10000 (NAT Offset)+100 (Session ID)
Packet P2:
Source IP address: 192.168.1.20→150.160.170.1 (NAT IP address)
SourcePort: 5678→10111=10000 (NAT Offset)+111 (Session ID)

The packets P1 and P2 are then sent to the WAN server.
The WAN server replies with a third and a fourth packets P3, P4 addressed to the first and the second internal host, respectively. Packets P1, P2 are identified by the following parameters:
Packet P3:
Session ID: 100
Source IP address (SRC-IP): 150.160.170.100;
Destination IP address (Dest-IP): 150.160.170.1;
Source Port (Src-Port): 21;
Destination Port (Dest-Port): 10100.
Packet P4:
Session ID: 111
Source IP address (SRC-IP): 150.160.170.100;
Destination IP address (Dest-IP): 150.160.170.1;
Source Port (Src-Port): 21;
Destination Port (Dest-Port): 10111.

When received by the gateway, the packets P3, P4 are processed by the NAT module, which extracts from the Destination Port the value of the session ID (Session ID=NAT Port-NAT Offset). The session ID value allows to directly point, for each packet, the proper session in the session database. From the identified session the filter extracts the IP address and the port of the LAN internal hosts addressees and updates the corresponding values of the two received packets P3, P4, which then can be routed to the correct devices.

The main advantages of the proposed solution are:
- simplification of the NAT implementation with respect to a traditional one;
- integration with the firewall functionality;
- performance improvement; it can be appreciated that the NAT function, that is performed on the majority of the packets traversing a gateway, is generally an heavy task for the networking device and in the proposed solution inbound NAT packets are treated in a very fast way (the internal path in the system is shorter than in the case of no NAT packets) saving processing time and allowing an higher throughput.

ALG Functionality

Sometimes higher level protocols such as FTP or SIP need Application Level Gateways (ALGs) in order to work properly in firewall/NAT environments. For example FTP is composed of a main control TCP connection and secondary data TCP connections. The task of a FTP ALG is to examine packets belonging to control session and open a data connection when necessary (for instance when a GET command is detected).

For FTP protocol the dynamic packet filter has to perform relatively easy tasks: it has to perform a GUS command to release a session from the LRU, fill its fields with proper value derived from the control packets, and finally insert it again in the LRU list with a INS command. In the presence of a NAT, the ALG has another task: it must change the payload of packets in order to reflect the translations of IP addresses and ports in the header. In particular it must replace in PORT commands the private IP with the NAT IP and the TCP port with the dynamic NAT port (the index of the session of data connection).

However there are more complex protocols that have also other requirements. The Session Initiation Protocol (SIP) used in VoIP applications is one important example. When a SIP session is initiated with an INVITE message, that message contains information about where the sender of the message will listen for RTP and RTCP multimedia connections; but together with the IP address, there is only one field indicating the RTP port. The RTCP port must be derived from the RTP port and must be exactly the next value, i.e., the two values must be contiguous. Another constraint is that the RTP port must be even (and obviously the RTCP one must be odd).

Briefly, the dynamic packet filter must be able to open two adjacent sessions, i.e. two sessions with consecutive ports, of which the first must be even. This is not a problem in "firewall-only" mode, because the information on the port is stored in the session and there is no relation between the port values and the session indexes. But in "NAT-mode" only the private port values are stored in sessions; the public ones are bound to the index in the array of the two sessions (RTP and RTCP). It is not guaranteed that two sessions obtained with a GUS command have consecutive index values because the LRU list is dynamic by its nature.

A solution to the above problem is to have also a separate set of sessions that can be handled only in couples: each couple must have consecutive indexes in the Session Database array and the first session must lead to an even port number in case of dynamic NAT (considering the fixed offset added to the index). This separate set of sessions, which are in turn arranged in a double-linked list, will be called Special Session Pool (SSP).

As further constraint, these sessions must be inserted in the LRU list when in use to allow normal hardware handling. A mechanism must be provided to delete these session couples and restore them in the SSP.

The following sections discuss a software solution to maintain the SSP using few commands provided by hardware (GUS and INS), including the following three steps: 1) initialization of the pool, 2) usage of session couples and 3) deletion of session couples.

The examples show a case of a SSP with couples of sessions (suitable for SIP ALG), but this mechanism can be extended to pools containing n-uples of sessions, each with different NAT port characteristics (for example only even ports). The size of session database here considered is 32 sessions; a pool with 8 special sessions (4 couples from index 2 to index 9) will be initialized and used.

Figure 16:
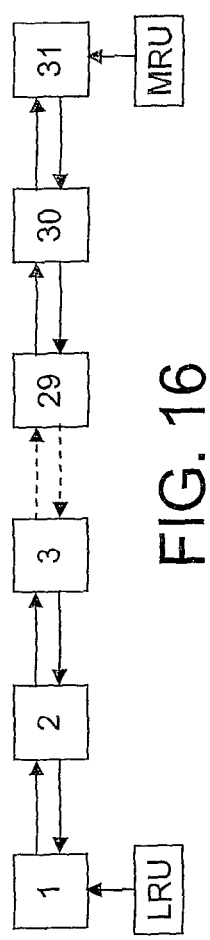
FIGS. 16 to 24 illustrate the steps of a method according to the present invention for supporting an ALG functionality.

The starting condition of the LRU list is shown in FIG. 16 (normal LRU list). It has been just initialized by software or hardware means and the session are numerically sorted in the list. Before any change can occur in the LRU list structure, the special session pool has to be extracted with the help of session's numerical order.

Software can access any session entry field, but cannot access MRU or LRU pointers. In the following it is described a solution to remove a number of consecutive sessions from LRU list and to insert them in a new double-linked list (using Previous/Next LRU pointers) whose head is pointed by a pointer called SSHEAD.

Figure 17:
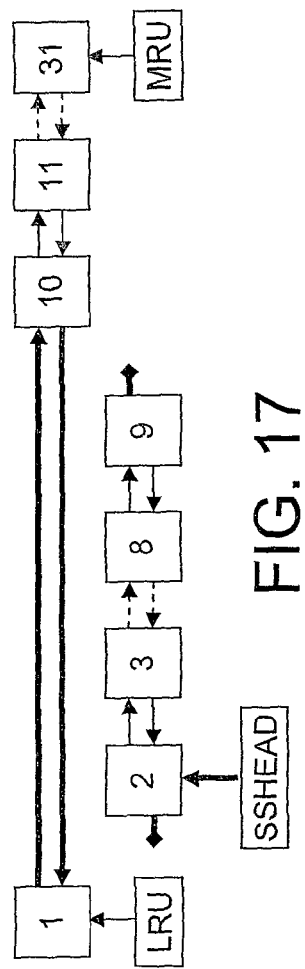

Software can find the first even non-LRU session of the database (in the example session 2) and then the last session needed (if eight sessions are needed, it will be session 9). Supposing that the last session will not be the MRU (in this case a smaller pool can be used), software just needs to change pointers of four sessions to extract the pool from the LRU list as described in FIG. 17 (modified pointers are marked in bold).

Figure 18:
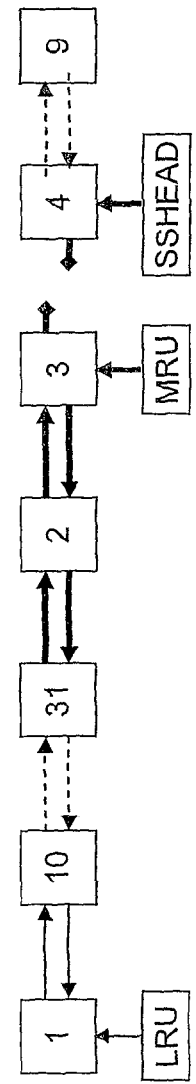

When the system (for example the SIP ALG) needs to open two holes/sessions, it can get them from special session pool using the SSHEAD pointer. In the example, sessions 2 and 3 are used: the ALG sets SSHEAD to "Next LRU pointer" of session 3, fills the sessions with proper parameters and executes an INS command for indexes 2 and 3. Result of this operation is shown in FIG. 18 (pointers changes in bold).

After these steps special sessions are treated exactly like normal ones: matching packets will bring them on the top of LRU list and their relative order may change without problem.

It is frequent that sessions couples could be closed, for example after reception of a successful reply to a SIP BYE request. After some execution time, no supposition can be made about the absolute or relative position of the couple in the LRU list.

To delete special session, the dynamic filter performs the following steps:
  A. Get the two consecutive session indexes;
  B. Remove sessions from LRU list and from hash table; and
  C. Append the sessions to special sessions pool in the right order.

Step B is the most complex, since a session can be in one of the four following cases:
  1. Session is in the middle of LRU list (i.e.: not LRU and not MRU session);
  2. Session is the LRU;
  3. Session is the MRU;
  4. Session is the only one in LRU list (LRU and MRU at the same time).

In the following examples session 2 is the one to be removed.

Figure 19:
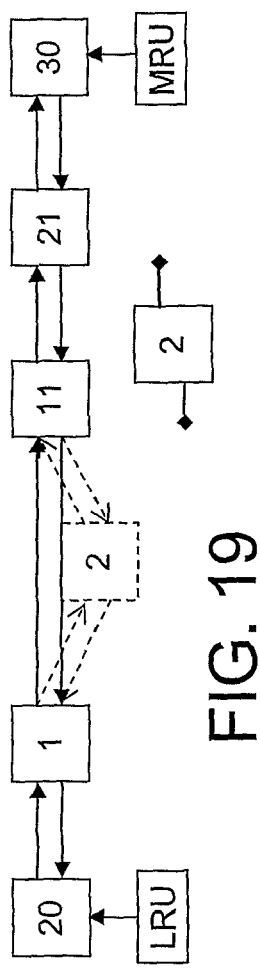

In the first example of FIG. 19, session 2 is in the middle of LRU list. The system modifies two pointers and removes session from the hash table.
  NextLRU[1]=11;
  PrevLRU[11]=1;
The pointers of the session 2 will be replaced with the proper values when inserted in the special session pool during step C. The resulting state is shown in FIG. 19.

Figure 20:
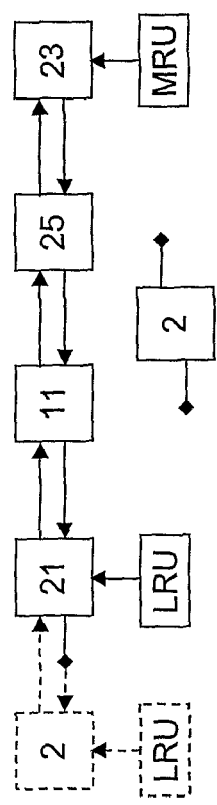

In the second example of FIG. 20, session 2 is the LRU session. In this case, the session can be deleted by using the GUS command: the system releases the session from LRU list and updates the hash table.

Figure 21:
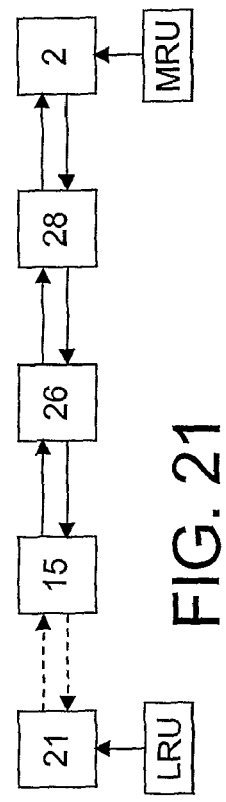

In the third example of FIG. 21, session 2 is the MRU session. This is not a common case: often special sessions need to be closed when a proper message is received at application level (for instance a SIP 'BYE'). This message matched a session that certainly changed as the MRU. Therefore, none of the special sessions should be the MRU, but this case is explained for completeness.

FIG. 21 shows the described situation. The system cannot remove session 2 changing its next and previous LRU pointers as in case 1 because the MRU pointer is not modifiable, or using the GUS command as in case 2 because this command acts only on the LRU session.

The workaround is to get any other session in the LRU list, and to put it as the MRU with the INS command. In this way, session 2 will not be the MRU anymore and it can be removed with method described in case 1 or 2. The best candidate to replace special session as MRU is the one pointed by Previous LRU pointer of session 2 because it is almost the most recently used; anyway, any other session can be removed (for instance the LRU with the GUS command).

Regardless of the chosen session and the method used to get it, the INS command updates the hash table with the session pointer, so two cases can happen here:
  The session was in use (i.e. it was present in the hash table): the system must remove the entry from the hash table before the INS command;
  The session was not in use (i.e. there was no reference in the hash table): the system must remove the entry from the hash table after the INS command.

Figure 22:
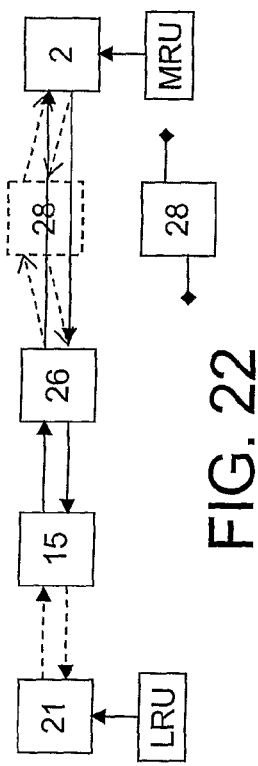
Figure 23:
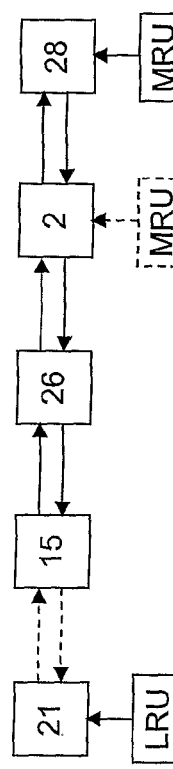

The process is clarified in FIG. 22, which shows the Extraction of the previous session of a MRU special session and FIG. 23, which shows that after an INS command this case can be treated as the case 1.

Figure 24:
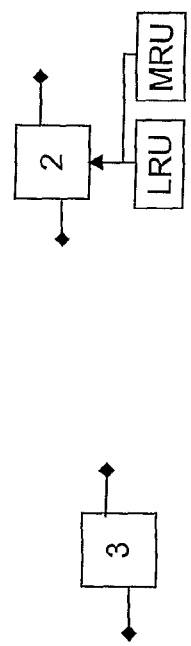

In the fourth example of FIG. 24, session 2 is the last LRU list element, i.e. the only one in the LRU list. Its twin (session 3) is obviously already pending.

The last session left in the LRU list cannot be removed. Therefore the software must abort the deletion process; it may insert again in the LRU list the twin session already removed from the list (session 3), but this is not necessary. Instead it must insert it in the hash table if not present.

There are also exceptional cases. One is the case of empty special session pool. In this case, if there are no unused special sessions when needed, two actions can be taken:
  Abort usage of special session couple.
  Scan the LRU list (from the least recently used session) in search for special sessions. When two consecutive special sessions are found, they can be removed and reused for new session. This solution can heavily decrease performances. An alternative is to use a separate LRU list of used special sessions; in this way, least used sessions can be retrieved instantly.

Computer Embodiment

Figure 25:
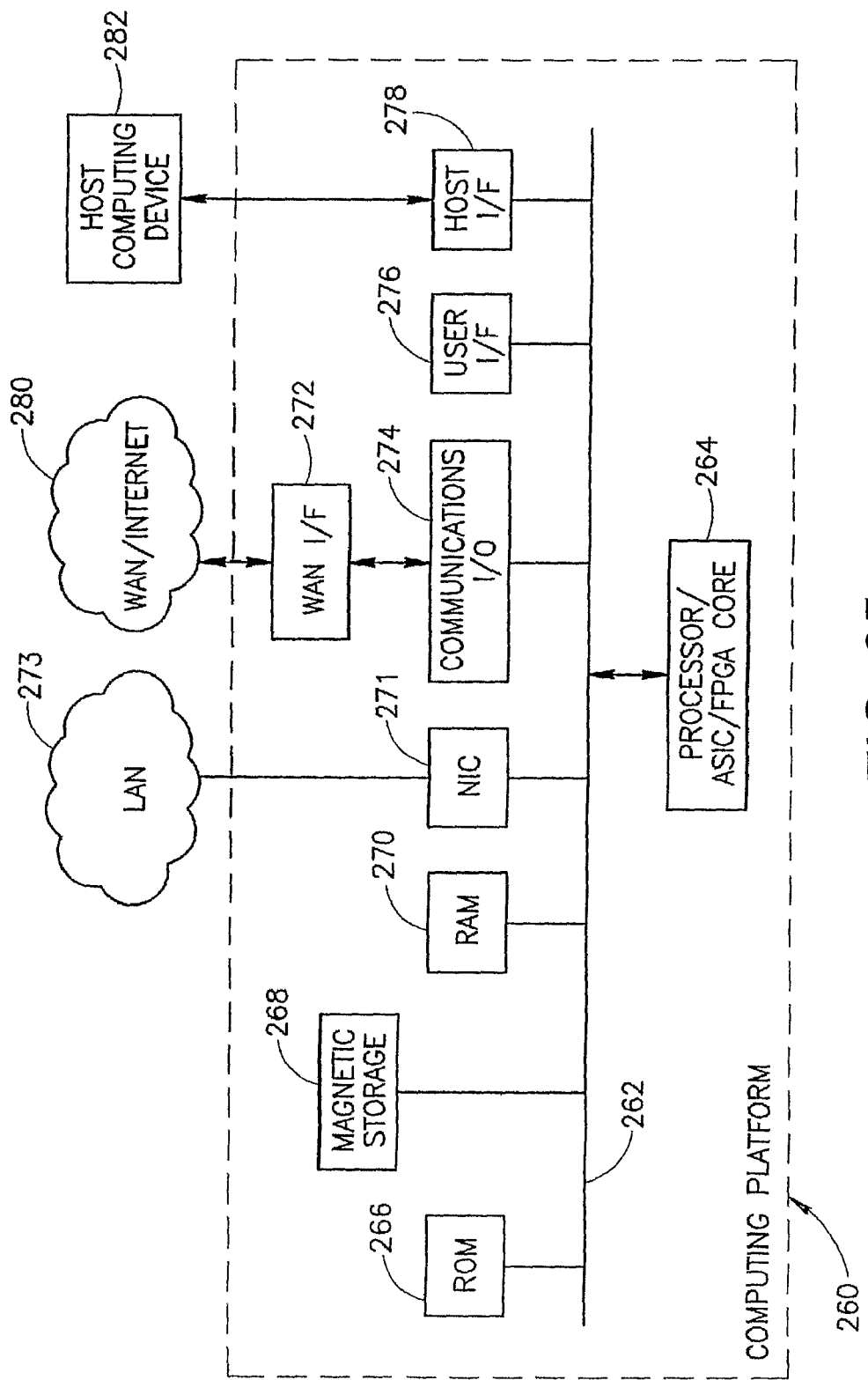
FIG. 25 is a block diagram illustrating an example computer processing system to platform adapted to perform the dynamic packet filtering with session tracking method of the present invention.

In a possible embodiment, a computer is operative to execute software adapted to perform the dynamic packet filter method of the present invention. A block diagram illustrating an example computer processing system to platform adapted to perform the dynamic packet filtering with session tracking method of the present invention is shown FIG. 25. The system may be incorporated within a communications device such as a PDA, cellular telephone, cable modem, broadband modem, laptop, PC, network transmission or switching equipment, network device or any other wired or wireless communications device. The device may be constructed using any combination of hardware and/or software.

The computer system, generally referenced 260, comprises a processor 264 which may be implemented as a microcontroller, microprocessor, microcomputer, ASIC core, FPGA core, central processing unit (CPU) or digital signal processor (DSP). The system further comprises static read only memory (ROM) 266 and dynamic main memory (e.g., RAM) 270 all in communication with the processor. The processor is also in communication, via a bus 262, with a number of peripheral devices that are also included in the computer system.

The device is connected to a WAN 280 such as the Internet via a WAN interface 272. The interface comprises wired and/or wireless interfaces to one or more WAN communication channels. Communications I/O processing 274 transfers data between the WAN interface and the processor. The computer system is also connected to a LAN 273 via a Network Interface Card (NIC) 271 depending on the implementation. In operation, the computer system is operative to dynamically filter inbound packets from the WAN to the LAN and outbound packets from the LAN to the WAN as described supra.

An optional user interface 276 responds to user inputs and provides feedback and other status information. A host interface 278 connects a host computing device 282 to the system. The host is adapted to configure, control and maintain the operation of the system. The system also comprises magnetic storage device 268 for storing application programs and data. The system comprises computer readable storage medium which may include any suitable memory means including but not limited to magnetic storage, optical storage, CD-ROM drive, ZIP drive, DVD drive, DAT cassette, semiconductor volatile or non-volatile memory, biological memory devices, or any other memory storage device.

Software updated to implement the functionality of the dynamic filter of the present invention is adapted to reside on a computer readable medium, such as a magnetic disk within a disk drive unit. Alternatively, the computer readable medium may comprise a floppy disk, Flash memory card, EPROM, EEROM, EEPROM based memory, bubble memory storage, ROM storage, etc. The software adapted to perform the dynamic packet filter method of the present invention may also reside, in whole or in part, in the static or dynamic main memories or in firmware within the processor of the computer system (i.e. within microcontroller, microprocessor, microcomputer, DSP, etc. internal memory).

In alternative embodiments, the method of the present invention may be applicable to implementations of the invention in integrated circuits, field programmable gate arrays (FPGAs), chip sets or application specific integrated circuits (ASICs), wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

In particular, it can be appreciated that, although in the preferred embodiment the packets sent from the WAN to the LAN can be provided with a destination port containing the session ID as a result of the previous receipt within the WAN of packets containing the session ID value in the source port, the method of the present invention can be applied irrespective of the way in which the WAN is aware of the session ID that he will use to generate the destination port of the packets addressed to the LAN; the session ID could be for example communicated to the WAN by including it in other parts of the outgoing packets, either in the header ot in the payload. In any case an incoming packet containing in the destination port the session ID will be processed as previously described.

The invention claimed is:

1. A method for exchanging digital data between a local area network and a wide area network, comprising:
   opening a communication session between the local area network and the wide area network;
   keeping a trace of said session in a session database where said session is associated with a respective session identifier;
   sending from the local area network to the wide area network at least one data packet having a source port value calculated as the sum of a fixed value and said session identifier;
   sending from the wide area network to the local area network at least one data packet having a destination port value indicative of the session identifier;
   determining if said destination port value is higher than said fixed value;
      when said destination port value is higher than said fixed value:
         extracting the session identifier from said destination port value by subtracting said fixed value from the destination port value, and
         using the extracted session identifier for directly accessing said session in the session database; and
      when said destination port value is lower than said fixed value:
         discarding the data packet.

2. The method of claim 1, wherein accessing said session in the session database comprises pointing to said session in the session database.

3. The method of claim 1, further comprising the step of checking said at least one data packet sent from said wide area network against a set of rules corresponding to at least a protocol, and if the rules are not fulfilled, stopping the data packets.

4. The method of claim 1, further comprising managing the sessions in a session list wherein the sessions are arranged according to a least-recently-used order and are linked to each other.

5. The method of claim 4, wherein the sessions are double-linked to each other.

6. The method of claim 4, wherein said list is a first list and wherein the session database comprises a second list of sessions comprising sessions extracted from said first list.

7. The method of claim 6, wherein said second list comprises a number of sessions that is a multiple of a minimum number of sessions required by an application protocol.

8. The method of claim 6, wherein opening a communication session comprises extracting a predetermined number of sessions from said second list and inserting said predetermined number of sessions into said first list.

9. The method of claim 1, wherein the step of sending from the local area network to the wide area network at least one data packet having a source port value calculated as the sum of a fixed value and said session identifier is performed by a network address translator.

10. The method of claim 1, wherein the step of using said session identifier for accessing said session in the session database is performed in a processing apparatus associated with said local area network.

11. The method of claim 1, wherein the session database is in an access gateway associated with said local area network.

12. A telecommunication system comprising:
a local area network and a wide area network suitable to exchange with each other data packets within respective communication sessions;
a processing apparatus interposed between the local area network and the wide area network and configured to read a destination port value of packets directed from the wide area network to the local area network, the processing apparatus comprising:
a network interface card for communicating with the local area network;
a wide area network interface, for communicating with the wide area network;
a central processing unit;
a memory; and
a session database associated with the processing apparatus for keeping a trace of said sessions, said sessions being identified in the session database by means of a session identifier;
the processing apparatus configured to:
open a communication session between the local area network and the wide area network;
keep a trace of said session in a session database where said session is associated with a respective session identifier;
send from the local area network to the wide area network at least one data packet having a source port value calculated as the sum of a fixed value and said session identifier;
send from the wide area network to the local area network at least one data packet having a destination port value indicative of the session identifier;
determine if said destination port value is higher than said fixed value;
when said destination port value is higher than said fixed value:
extract the session identifier from said destination port value by subtracting said fixed value from the destination port value, and
use the extracted session identifier for directly accessing said session in the session database; and
when said destination port value is lower than said fixed value:
discard the data packet.

13. A network address translator configured to;
change, by a processor, a source port of a first data packet transmitted within a communication session from a first source port value to a second source port value indicative of an identifier of said session, wherein the second source port value is the sum of a fixed value and said session identifier when the first data packet is being transmitted from a local area network to a wide area network;
receive a second data packet, the second data packet being transmitted from the wide area network to the local area network, wherein the second data packet has a destination port value indicative of the session identifier;
determining if said destination port value is higher than said fixed value;
when said destination port value is higher than said fixed value:
change the destination port value of the second data packet from the second source port value to the first source port value; and
when said destination port value is lower than said fixed value, discard the second data packet.

* * * * *